US009893894B2

United States Patent
Stojanovski et al.

(10) Patent No.: US 9,893,894 B2
(45) Date of Patent: Feb. 13, 2018

(54) SYSTEMS, METHODS, AND DEVICES FOR SECURE DEVICE-TO-DEVICE DISCOVERY AND COMMUNICATION

(71) Applicant: INTEL IP CORPORATION, Santa Clara, CA (US)

(72) Inventors: Alexandre S. Stojanovski, Paris (FR); Farid Adrangi, Lake Oswego, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 151 days.

(21) Appl. No.: 14/863,168

(22) Filed: Sep. 23, 2015

(65) Prior Publication Data

US 2016/0269185 A1 Sep. 15, 2016

Related U.S. Application Data

(60) Provisional application No. 62/132,973, filed on Mar. 13, 2015.

(51) Int. Cl.
*H04L 9/32* (2006.01)
*H04W 8/00* (2009.01)
(Continued)

(52) U.S. Cl.
CPC ............ *H04L 9/3247* (2013.01); *H04L 9/083* (2013.01); *H04L 9/0844* (2013.01);
(Continued)

(58) Field of Classification Search
CPC . H04L 9/3247; H04L 9/3066; H04L 2209/24; H04L 2209/72; H04W 12/06; H04W 76/023; H04W 8/005
(Continued)

(56) References Cited

U.S. PATENT DOCUMENTS

2009/0193506 A1* 7/2009 McGrew ............. H04L 63/0263
  726/6
2013/0198518 A1* 8/2013 Ran ....................... H04L 9/0861
  713/170
(Continued)

FOREIGN PATENT DOCUMENTS

WO 2014165747 A1 10/2014
WO 2014208035 A1 12/2014

OTHER PUBLICATIONS

M. Groves, MIKEY—SAKKE: Sakai—Kasahara Key Encryption in Multimedia Internet KEYing (MIKEY), Feb. 2012, IETF, pp. 1-22.*
(Continued)

*Primary Examiner* — Ashok Patel
*Assistant Examiner* — Abdullah Almamun
(74) *Attorney, Agent, or Firm* — Stoel Rives LLP

(57) ABSTRACT

A user equipment (UE) is configured to send a direct communication request to a peer UE, wherein the direct communication request comprises a signature authenticating an identity of the UE. The UE is configured to process a direct communication response from the peer UE to authenticate an identity of the peer UE, wherein the direct communication response comprises a signature authenticating the identity of the peer UE. In response to processing the direct communication response from the peer UE to authenticate the identity of the peer UE, the UE is configured to engage in direct communication with the peer UE.

11 Claims, 15 Drawing Sheets

(51) Int. Cl.
    *H04W 76/02* (2009.01)
    *H04L 9/30* (2006.01)
    *H04W 12/06* (2009.01)
    *H04L 9/08* (2006.01)
(52) U.S. Cl.
    CPC .......... *H04L 9/3066* (2013.01); *H04L 9/3252* (2013.01); *H04W 8/005* (2013.01); *H04W 12/06* (2013.01); *H04W 76/023* (2013.01); *H04L 2209/24* (2013.01); *H04L 2209/72* (2013.01); *H04L 2209/80* (2013.01)
(58) Field of Classification Search
    USPC ........................................................ 713/176
    See application file for complete search history.

(56) References Cited

U.S. PATENT DOCUMENTS

| | | | | |
|---|---|---|---|---|
| 2013/0205378 A1* | 8/2013 | Oba | ...................... | H04W 12/06 726/7 |
| 2014/0119544 A1 | 5/2014 | Lee | | |
| 2014/0282877 A1* | 9/2014 | Mahaffey | ............ | H04L 63/0853 726/3 |
| 2015/0079899 A1* | 3/2015 | Hakola | ................. | H04W 8/005 455/39 |
| 2015/0124963 A1* | 5/2015 | McCusker | ............ | H04L 63/083 380/46 |
| 2015/0244525 A1* | 8/2015 | McCusker | ............ | H04L 9/3218 380/44 |
| 2015/0358804 A1* | 12/2015 | Fransen | .................. | H04L 12/18 370/329 |
| 2016/0255502 A1* | 9/2016 | Rajadurai | ............ | H04L 9/0825 713/171 |

OTHER PUBLICATIONS

3GPP TR 23.713, "3rd Generation Partnership Project; Technical Specification Group Services and System Aspects; Study on extended architecture support for Proximity-based services", (Release 13) V0.4.0, Feb. 2015, 59 pages.

Groves, "Elliptical Curve-Based Certificateless Signatures for Identity-Based Encryption (ECCSI)", Internet Engineering Task Force (IETF), Request for Comments: (6507), Category: Informational, ISSN: 2070-1721, Feb. 2012, 17 pages.

Groves, "Sakai-Kasahara Key Encryption (SAKKE)", Internet Engineering Task Force (IETF), Request for Comments: 6508, Category: Informational; ISSN: 2070/1721, Feb. 2012, 21 pages.

PCT/US2016/018180, International Search Report and Written Opinion, dated Apr. 25, 2016, 12 pages.

\* cited by examiner

SYSTEMS, METHODS, AND DEVICES FOR SECURE DEVICE-TO-DEVICE DISCOVERY AND COMMUNICATION

RELATED APPLICATION

This application claims the benefit under 35 U.S.C. § 119(e) of U.S. Provisional Application No. 62/132,973, filed Mar. 13, 2015, which is hereby incorporated by reference herein in its entirety.

TECHNICAL FIELD

The present disclosure relates to device-to-device communication and more particularly relates to secure device-to-device discovery and communication.

DETAILED DESCRIPTION OF PREFERRED EMBODIMENTS

A detailed description of systems and methods consistent with embodiments of the present disclosure is provided below. While several embodiments are described, it should be understood that disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as WiMAX (Worldwide Interoperability for Microwave Access); and the IEEE 802.11 standard, which is commonly known to industry groups as WiFi. In 3GPP radio access networks (RANs) in LTE systems, the base station can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs) in an E-UTRAN, which communicates with the wireless mobile device, known as user equipment (UE). A downlink (DL) transmission can be a communication from the base station (or eNB) to the wireless mobile device (or UE), and an uplink (UL) transmission can be a communication from the wireless mobile device to the base station.

Figure 1:
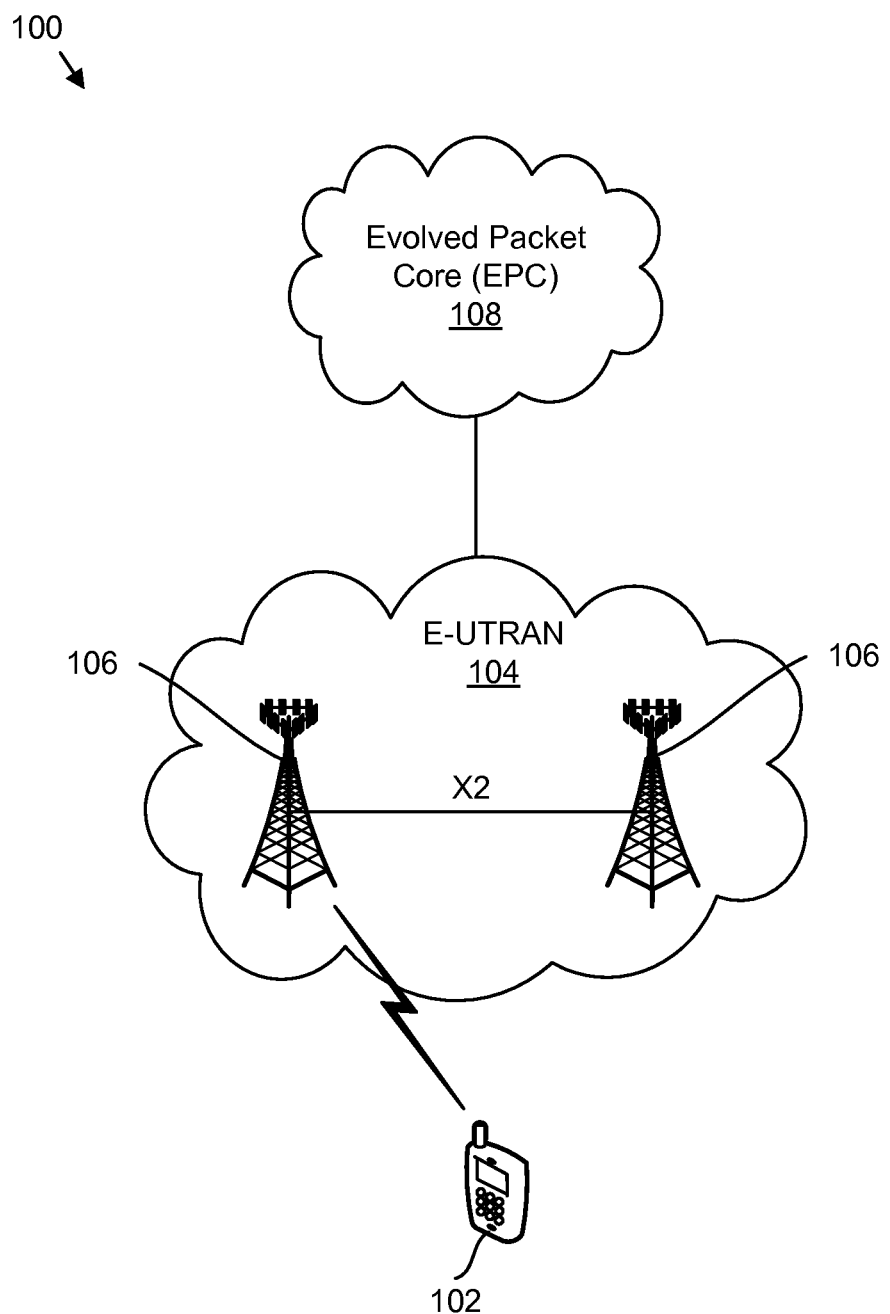
FIG. 1 is a schematic diagram illustrating a communication system for providing communication services to user equipment (UE), consistent with embodiments disclosed herein.

FIG. 1 illustrates one embodiment of a communication system 100 for providing communication services to a UE 102. The communication system 100 includes an E-UTRAN 104, which includes eNBs 106, and an evolved packet core (EPC) 108. The UE 102 may include any type of communications and/or computing device. Example UEs 102 include phones, smartphones, personal digital assistants (PDAs), tablet computers, notebook computers, ultrabook computers, and the like. The UE 102 may include a plurality of applications installed and running on the UE 102 which may periodically communicate data over the E-UTRAN 104 and/or EPC 108. The UE 102 may include devices configured to communicate using a 3GPP standard such as universal mobile telecommunication system (UMTS), LTE, LTE-Advanced (LTE-A), or the like. In some embodiments, the UE 102 may include a mobile wireless device configured to communicate based on any other wireless communication standard.

The E-UTRAN 104 is configured to provide wireless data access to the UE 102 and a plurality of other wireless mobile devices. The E-UTRAN 104 provides wireless data, voice, and/or other communications available through the EPC 108 to the UE 102, including the plurality of applications installed on the UE 102. In one embodiment, the E-UTRAN 104 operates according to a wireless protocol, such as a wireless protocol that the UE 102 is capable of using. The eNBs 106 may implement transmission point and RNC functions. The eNBs 106 are configured to communicate with each other via an X2 interface, as depicted.

In addition to communicating with the E-UTRAN 104 and/or the EPC 108, the UE 102 may communicate directly with other mobile communication devices. Proximity-based applications and proximity services (ProSe) represent an emerging social-technological trend. Proximity-based communication (which is also referred to herein as device-to-device (D2D) communication, direct communication, one-to-one communication, or peer-to-peer (P2P) communication) is a powerful technique for increasing network throughput by enabling direct communications between mobile stations rather than using network infrastructure, and has a wide variety of applications. For example, D2D has been proposed for local social networks, content sharing, location-based marketing, service advertisements, public safety networks, mobile-to-mobile applications, and other services. D2D communications are of interest due to their ability to reduce load on a core network or a RAN, increase data rates due to direct and short communication paths, provide public safety communication paths, and provide other functionality. The introduction of a ProSe capability in LTE would allow the 3GPP industry to serve this developing market and, at the same time, serve the urgent needs of several public safety services. This combined use may enable economy-of-scale advantages because the resulting system may be used for both public safety and non-public-safety services, where possible.

There are various alternatives to realize such a direct communication path between mobile devices. In one embodiment, the D2D air interface PC5 (i.e., interface for D2D communication) could be realized by some type of short-range technology, such as Bluetooth or WiFi, or by reusing a licensed LTE spectrum, such as a UL spectrum in a frequency division duplex (FDD) system and UL sub-frames in a time division duplex (TDD) system.

In one embodiment, the present disclosure is related to a 3GPP Release (Rel) 13 work item on Proximity Services called eProSe-Ext. See 3GPP Technical Report (TR) 23.713 and TR 33.303. As part of Rel-12, 3GPP specified a mechanism for one-to-many ProSe direct communication between one transmitting device and a group of receiving devices. As part of its Rel-13, 3GPP is continuing the work on public safety features, notably support for ProSe direct discovery for public safety use and support for one-to-one ProSe direct communication (between a pair of devices). The procedures for ProSe direct discovery are described in TR 23.713, clause 6. According to a 3GPP Rel-13 study on ProSe enhancements, there are three types of public safety discovery (see 3GPP TR 23.713). The first is UE-to-network relay discovery, the second is group member discovery, and the third is UE-to-UE relay discovery. All three types of discovery can be performed as either Model A (announce/monitor) or Model B (discoverer/discoveree). The terms discoveree and discoveree UE may also be referred to as target or target UE, respectively. The Model A procedure includes a single message (announcement) that is periodically broadcasted by the announcing UE. The Model B procedure is performed with two messages: a solicitation message (typically broadcasted or groupcasted) and a response message (typically unicasted).

As described below, two call flows are shown from TR 23.7113 for the specific cases of group member discovery with Model A ("I am here") in FIG. 2 and group member discovery with Model B ("Who is there?/Are you there?") in FIG. 3.

Figure 2:
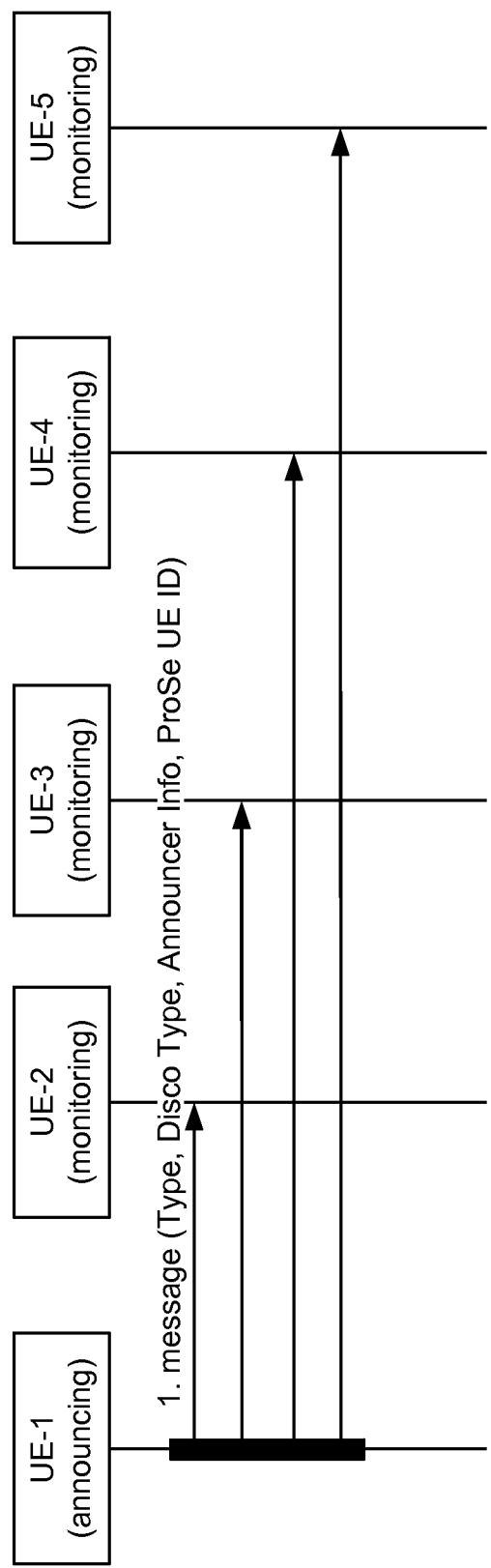
FIG. 2 is a schematic block diagram illustrating an example call flow for Model A discovery.

FIG. 2 illustrates group member discovery with Model A discovery based on FIG. 6.1.2.3.1-1 of 3GPP TR 23.713. In this example, five UEs are shown (labeled UE-1, UE-2, UE-3, UE-4, and UE-5). In the call flow UE-1, the announcing UE sends a discovery message that includes an indication of a message type, a discovery type, announcer information, and a ProSe UE identifier (ID). In FIG. 2, the message type is an announcement, the discovery type is group member discovery, the announcer information includes information about the announcing user, and the ProSe UE ID is a link layer identifier that is used for direct communication. In one embodiment, the announcer information includes a MAC address.

Figure 3:
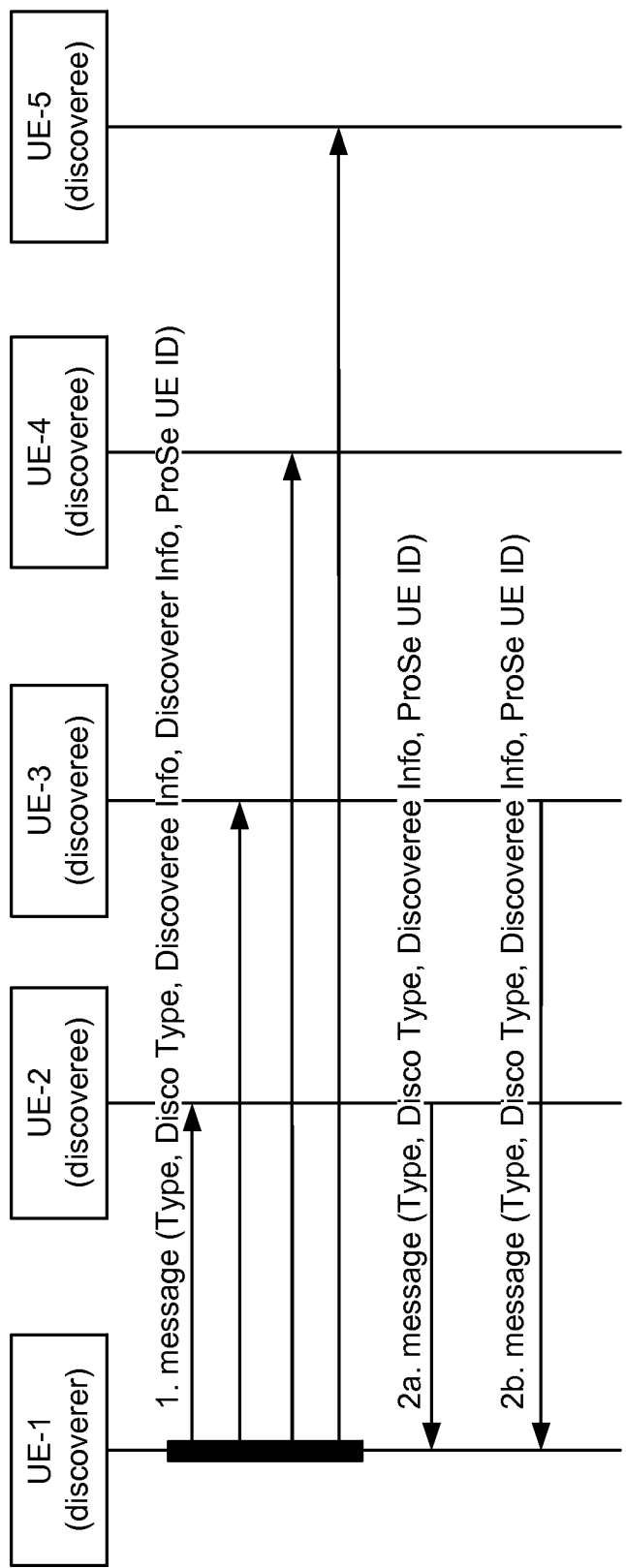
FIG. 3 is a schematic block diagram illustrating an example call flow for Model B discovery.

FIG. 3 illustrates group member discovery with Model B discovery based on FIG. 6.1.2.3.2-1 of 3GPP TR 23.713. Again, in this example, five UEs are shown (labeled UE-1, UE-2, UE-3, UE-4, and UE-5). In the call flow, UE-1, the discoverer UE, sends a discovery message with a solicitation message type, a group member discovery type, information about any discoverees (targeted users or group of users), discoverer information about the discoverer user, and a ProSe UE ID for UE-1. One or more of the discoveree UEs may respond with discovery response messages. For example, UE-2 and UE-3 respond with messages that indicate a response message type, a group member discovery type, discoveree information for respective users, and ProSe UE IDs for the respective UEs. In one embodiment, the discoverer information includes a MAC address.

Figure 4:
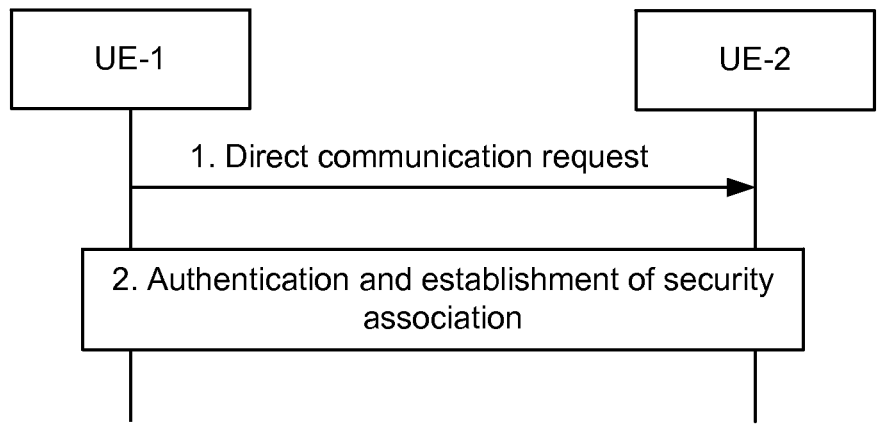
FIG. 4 is a schematic block diagram illustrating an example call flow for establishment of direct communications.
Figure 5:
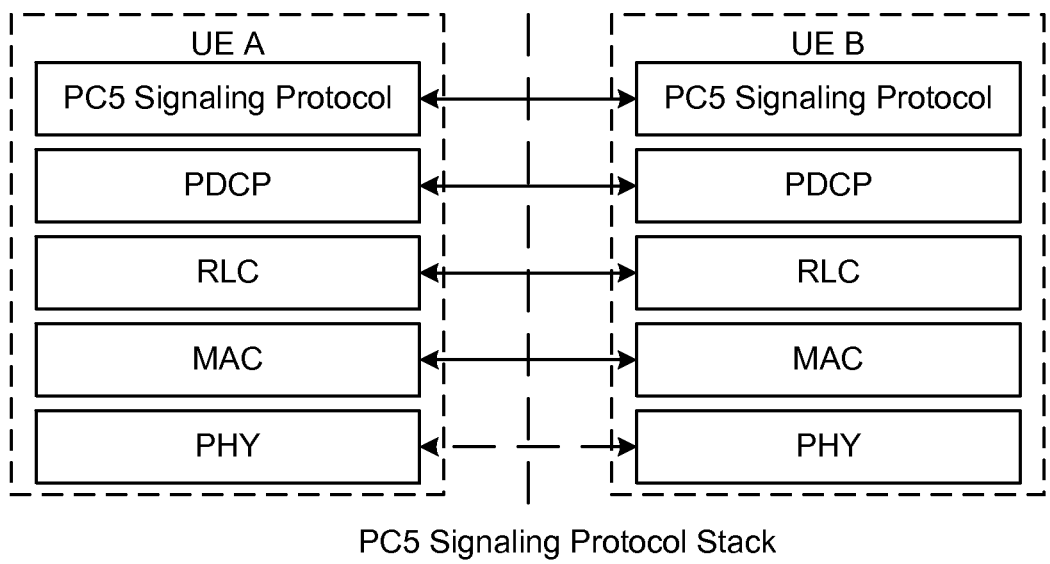
FIG. 5 is a schematic block diagram illustrating a PC5 protocol stack.

FIG. 4 illustrates a call flow for establishment of one-to-one ProSe direct communication as described in TR 23.713, clause 7.1. For example, the direct communication may be established over a secure physical layer link or layer-2 link over PC5 (see TR 23.713, clause 7.1.2.1-1). In the call flow, UE-1 sends a direct communication request message to UE-2 in order to trigger mutual authentication. Note: The link initiator (UE-1) needs to know the Layer-2 ID, or other layer ID, of the peer (UE-2) in order to send the communication request. As an example, the link initiator may learn the Layer-2 ID or physical layer ID of the peer by executing a discovery procedure first or by having participated in ProSe one-to-many communication including the peer. In response to the direct communication request, UE-2 initiates a procedure for mutual authentication. The successful completion of the authentication procedure completes the establishment of the secure link over PC5. In one embodiment, the direct communication request message is part of the PC5 signaling protocol, of which the protocol stack is depicted in FIG. 5. FIG. 5 is a block diagram illustrating the PC5 signaling protocol stack based on FIG. 7.1.1.2-1 in TR 23.713. This example shows communication between two UEs (UE A and UE B). The PC5 signaling protocol stack includes a physical (PHY) layer, a medium access control (MAC) layer, a radio link control (RLC) layer, a packet data convergence protocol (PDCP) layer, and a PC5 signaling protocol layer.

Currently, the security details of both ProSe direct discovery for public safety use and one-to-one ProSe direct communication are currently not specified. While currently the transport option for the ProSe direct discovery messages is not yet agreed upon, embodiments herein assume that messages are carried via the PC5 signaling protocol, the physical layer, or the like.

In light of the foregoing, the present disclosure describes the use of the identity-based cryptography and key agreement within the context of ProSe direct discovery and one-to-one ProSe direct communication. ProSe direct discovery for public safety use and ProSe direct communication may need to be used when UEs are out of network coverage, i.e., when there is no real-time availability of a common root of trust. In one embodiment, digital certificates or identity-based cryptography can be used to establish a secure association (i.e., mutual authentication and key agreement) between the two devices. In one embodiment, security solutions for both ProSe direct discovery and one-to-one ProSe direct communication rely on the following identity-based cryptography mechanisms: the "Elliptic Curve-based Certificateless Signatures for Identity-based Encryption" (ECCSI) signature scheme, as defined in the Internet Engineering Task Force (IETF) Request for Comments (RFC) 6507, and the Sakai-Kasahara Key Encryption (SAKKE) algorithm used to exchange a shared secret from a sender to a receiver, as defined in IETF RFC 6508. In one embodiment, the disclosure proposes application of the ECCSI signature scheme and SAKKE algorithm as mechanisms for mutual authentication and key agreement, respectively, over the PC5 interface (UE-to-UE). Some embodiments disclose procedures and parameters exchanged as part of ProSe direct discovery and/or ProSe direct communication when using identity-based encryption.

Figure 6A:
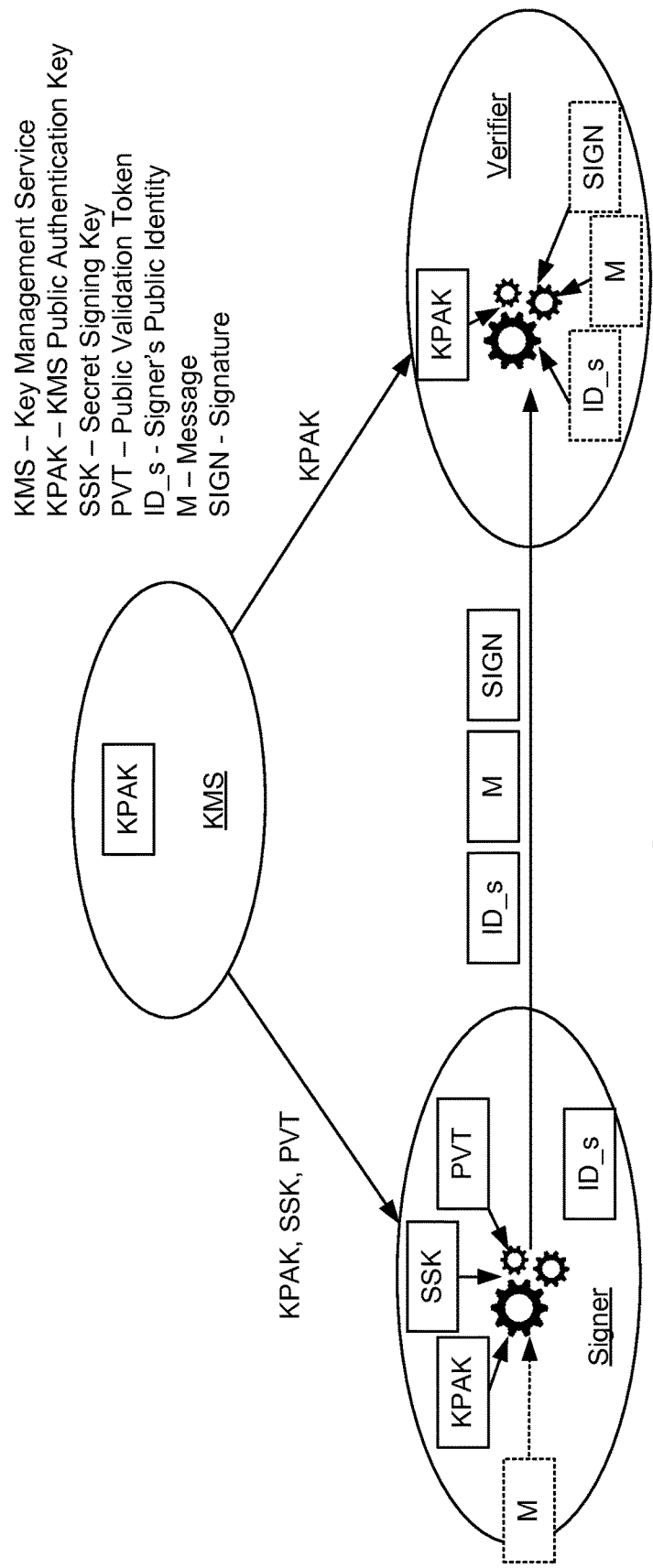
FIG. 6A is a schematic block diagram illustrating an Elliptic Curve-based Certificateless Signatures for Identity-based Encryption (ECCSI) signature scheme.

FIG. 6A is a schematic block diagram illustrating an ECCSI signature scheme which allows a message (M) to be signed by a signer and then verified by a verifier using identity-based cryptography. In one embodiment, M may be a null message. The signer and the verifier have a common root of trust referred to as the Key Management Service (KMS). The KMS owns a KMS Public Authentication Key (KPAK) that is known by all users. In addition, every user has a publicly known identity (e.g., ID_s is the public identity of the signer in FIG. 6A). In one embodiment, use of the ECCSI signature scheme allows a signer to assert an identity and to provide proof of identity (in the form of a digital signature). In one embodiment, the only commonality between verifier and signer is that they need a common root of trust, such as a credential that can be traced back to a KMS.

Every user wishing to digitally sign its messages needs to apply to the KMS for a pair of values including a Secret Signing Key (SSK) and a Public Validation Token (PVT). In reference to FIG. 6A, the signer uses the KPAK, SSK, and PVT parameters to produce a digital signature (SIGN) according to the algorithm described in the ECCSI signature scheme (RFC 6507). Please note that the PVT parameter is not secret and may be included inside the SIGN payload as clear text. Upon reception of a digitally signed message, the verifier uses the KPAK and signer's public identity (ID_s) to perform a verification algorithm as described in RFC 6507. In one embodiment disclosed herein, KPAK, SSK, and PVT may be provisioned at configuration time, and not in real time, so that the ECCSI signature scheme may be used even in out-of-coverage scenarios.

Figure 6B:
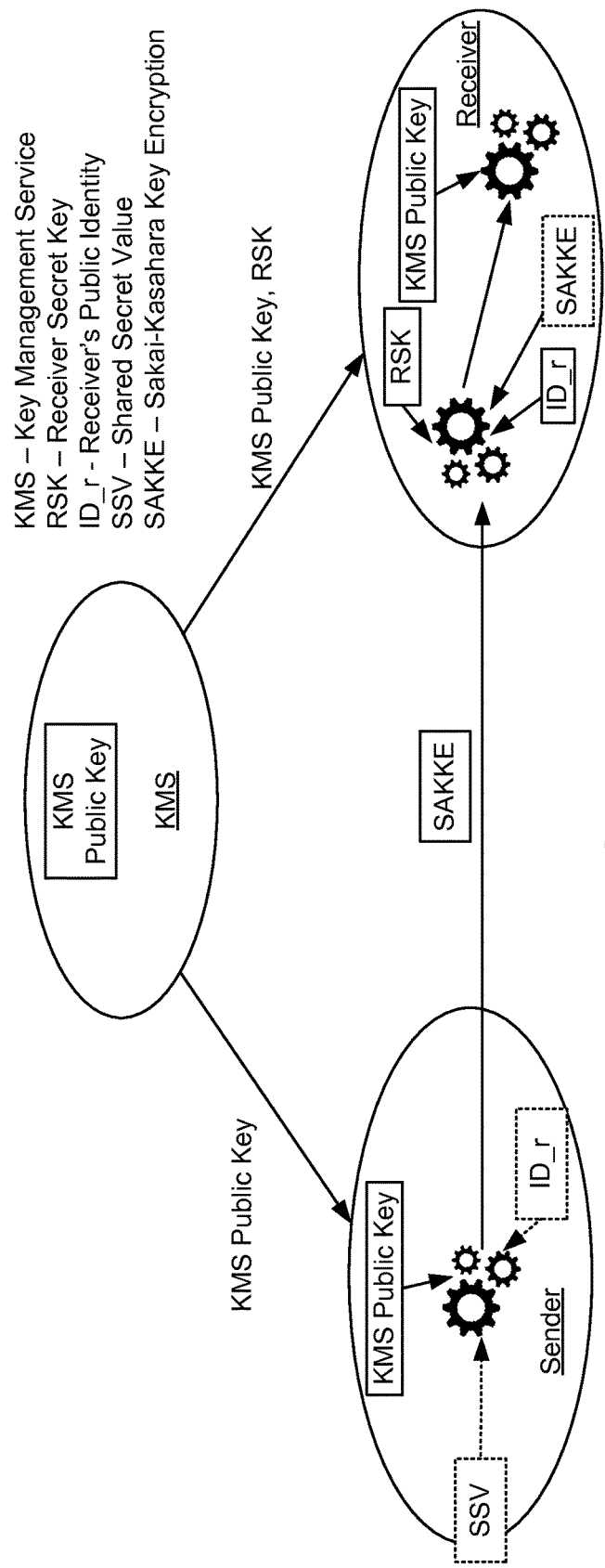
FIG. 6B is a schematic block diagram illustrating a Sakai-Kasahara Key Encryption (SAKKE) algorithm.

FIG. 6B is a schematic block diagram illustrating a SAKKE algorithm which allows for encrypted exchange of a shared secret key between a sender and a receiver using identity-based cryptography. Again, the sender and the receiver have a common root of trust (the KMS). The KMS owns a KMS Public Key that is known by all users. In addition, every user has a publicly known identity (e.g., ID_r is the public identity of the receiver in FIG. 6B).

Every user wishing to decrypt messages needs to apply to the KMS for a Receiver Secret Key (RSK). In reference to FIG. 6B, the sender uses the KMS Public Key and the receiver's public identity (ID_r) to encode a Shared Secret Value (SSV) according to the algorithm described in RFC 6508. The encrypted payload in FIG. 6B is referred to as a SAKKE payload. Upon reception of a SAKKE payload, the receiver uses the KMS Public Key, the RSK, and the receiver's public identity (ID_r) to perform the decryption algorithm as described in RFC 6508. In one embodiment, the SAKKE algorithm and payload allow devices or users to exchange a secret key that can be used for communication of any subsequent data. For example, a user or device can generate a secret key on the fly and securely share with another party.

In one embodiment, it is proposed to apply the ECCSI signature scheme and/or the SAKKE algorithm for secret key exchange for user authentication and key agreement over PC5. Several embodiments are disclosed that may be applied whether security mechanisms are executed during ProSe direct discovery or during establishment of a direct communication, and whether Model A or Model B discovery is used.

In one embodiment, in order to enable the use of the ECCSI signature scheme and/or the SAKKE algorithm for secret key exchange, it is assumed that UEs depend on a common root of trust: the KMS. In one embodiment, the KMS may be an entity located in the E-UTRAN 104 or EPC 108, accessible via the Internet, or in another location. In one embodiment, each UE needs to be configured with the following information: a KPAK, an SSK, a PVT, a KMS Public Key, and an RSK. In addition, each UE may be able to use a public identity that, depending on the context, is used as "Announcer Info," "Discoverer Info," "Discoveree Info" (or, alternatively, target info), or "User of UE-x Info."

In some embodiments, it is assumed that a UE uses the same public identity (e.g., a user identity) for both ECCSI signatures and SAKKE key exchange. While this identity may be encoded in any format that is compatible with the guidelines provided in RFC 6509, one embodiment assumes that the identity is a concatenation of a fixed part (in the form of an international mobile subscriber identity (IMSI), a session initiation protocol (SIP) uniform resource identifier (URI), a telephone URI (TEL URI), a user@domain type of URI, etc.) and a varying part (in the form of a timestamp).

Figure 7:
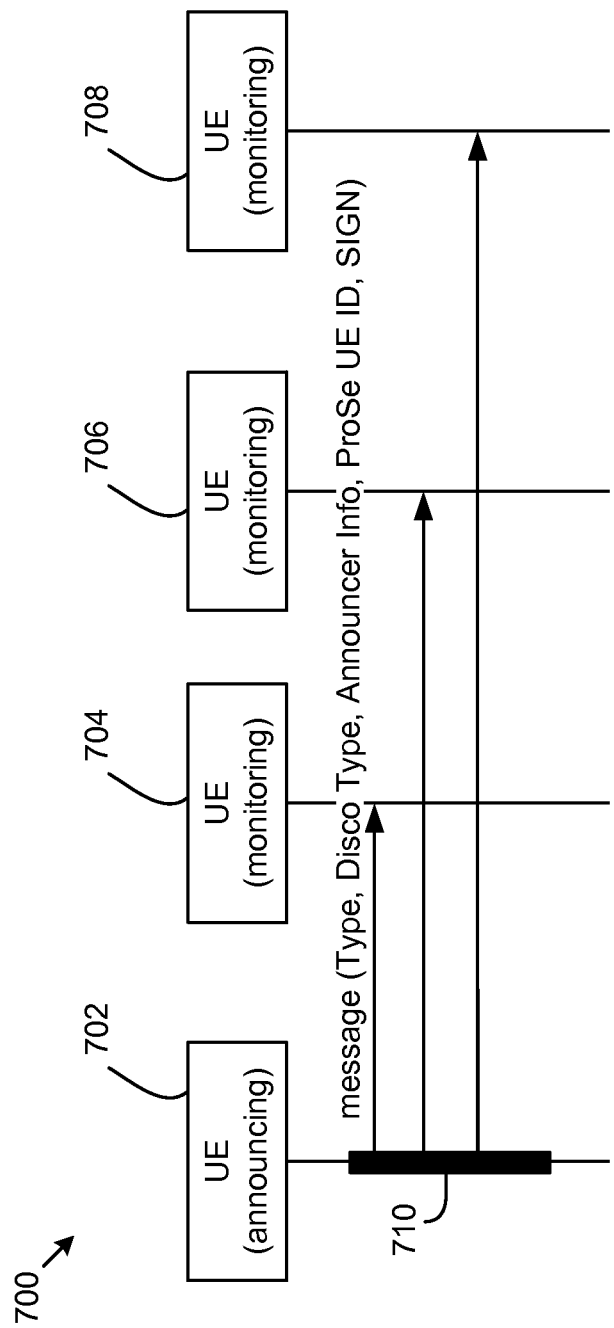
FIG. 7 is a schematic block diagram illustrating an example call flow for Model A group member discovery, consistent with embodiments disclosed herein.

FIG. 7 is a diagram of a call flow 700 illustrating one example of group member discovery between an announcing UE 702 and a plurality of monitoring UEs 704, 706, 708 using Model A (announcement) discovery. At 710, the announcing UE 702 periodically transmits a discovery message including the following parameter settings: type=announcement; discovery type=group member discovery; announcer info=upper layer information about the user of the announcing UE 702 (this information may be used to derive the signer's identifier ID_s in FIG. 6A); ProSe UE ID=a link layer ID of the announcing UE 702 (when the PC5 signaling protocol is used to transport the announcement message, the ProSe UE ID may be carried in the source Layer-2 ID field of a MAC frame); and SIGN=an ECCSI signature of the announcement message. The signature may be computed over all or a subset of the parameters in the message. In one embodiment, the signature is computed, at a minimum, over the announcer info parameter. Upon reception of the announcement message, one or more of the monitoring UEs 704, 706, 708 verify the signature payload SIGN. If the verification test is successful, the one or more monitoring UEs 704, 706, 708 present the authenticated identity ("announcer info") to a respective user of the UE. For example, the user may be given an option to allow the announcing UE 702 to discover a monitoring UE, such as UE 704.

Figure 8:
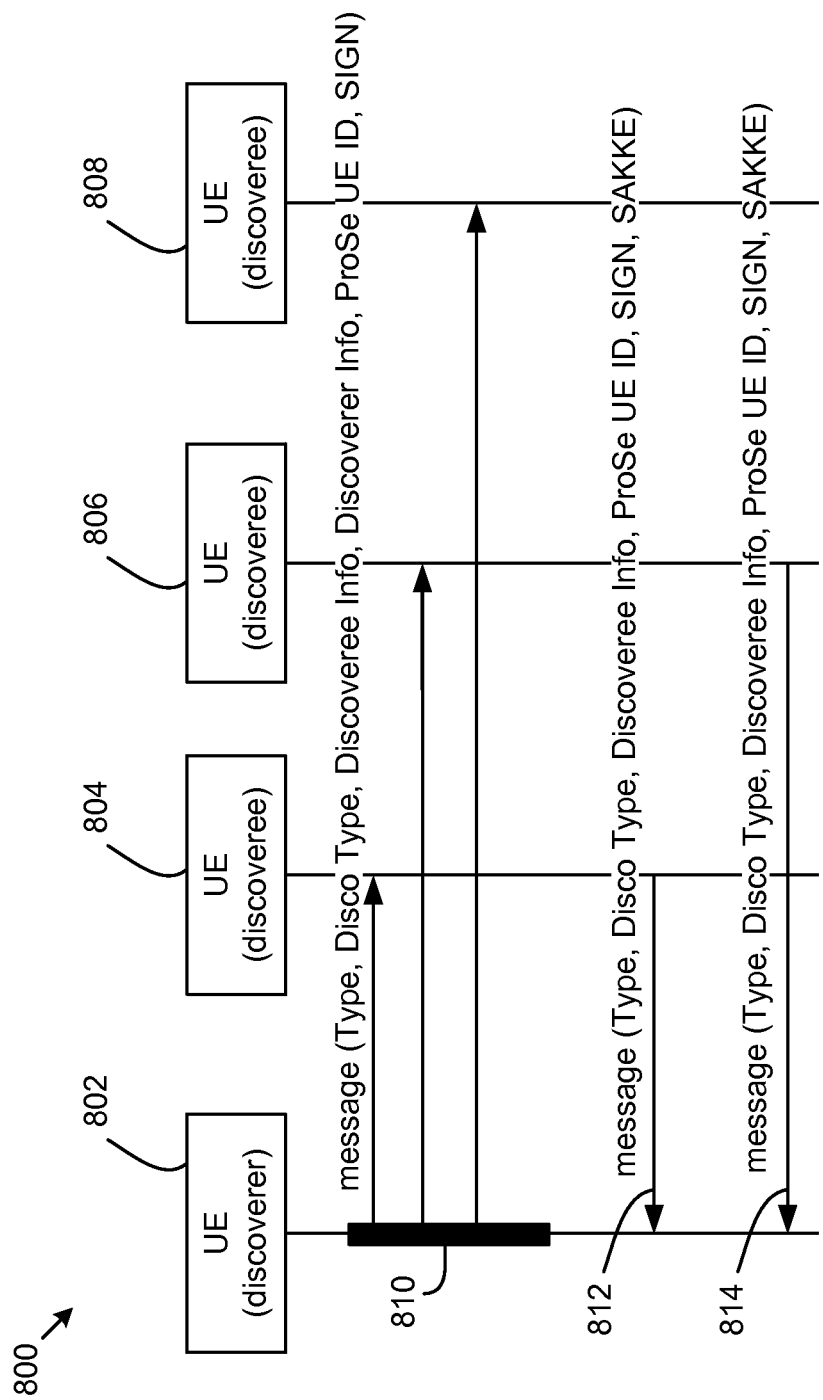
FIG. 8 is a schematic block diagram illustrating an example call flow for Model B group member discovery, consistent with embodiments disclosed herein.

FIG. 8 is a diagram of a call flow 800 illustrating one example of group member discovery between a discoverer UE 802 and a plurality of discoveree UEs 804, 806, 808 using Model B discovery. At 810, the discoverer UE 802, wishing to discover group members in the vicinity, transmits a discovery message including the following parameter settings: type=solicitation; discovery type=group member discovery; discoveree info=upper layer information identifying a target user or group of users; discoverer info=upper layer information about the user of the discoverer UE 802 (this information may be used to derive the signer's identifier ID_s in FIG. 6A); ProSe UE ID=a link layer ID (e.g., a Layer-2 ID or physical layer ID) of the discoverer UE 802 (when PC5 signaling protocol is used to transport the solicitation message, the ProSe UE ID may be carried in a source Layer-2 ID field of a MAC frame carrying the solicitation message); SIGN=an ECCSI signature of the solicitation message. The signature may be computed over all or a subset of the parameters in the message. In one embodiment, the signature is computed, at a minimum, over the discoverer info parameter.

Upon reception of the solicitation message, one or more of the discoveree UEs 804, 806, 808 check whether they are concerned by the message, by inspecting the discoveree info parameter. The one or more of the discoveree UEs 804, 806, 808 may verify the signature payload SIGN to determine whether the discoverer UE 802 really corresponds to the discoverer info. If the verification test is successful, one or more of the discoveree UEs 804, 806, 808 may respond with a discovery message. Specifically, discoveree UE 804 responds at 812 and discoveree UE 806 responds at 814 with discovery response messages that include the following payload or settings: type, discovery type, discoveree info, ProSe UE ID, SIGN, and SAKKE. In the messages 812 and 814, the type is response. The discovery type is group member discovery. The discoveree info includes upper layer information identifying the user of the respective discoveree UE. For example, the discoveree information in the messages 812 and 814 may include information identifying UEs 804 and 806, respectively. This information may be used to derive the signer's identifier ID_s. Note that the discoveree info in the messages 812 and 814 may be different from discoveree info in the message 810. For example, the discoveree info in the message 810 may refer to a targeted group of users, whereas the discoveree info in the messages 812 and 814 may refer to a single discoveree user.

The ProSe UE ID includes a link layer ID of the respective discoveree UE 804, 806. For example, if PC5 signaling protocol is used to transport the response message, the ProSe UE ID may be carried in the source Layer-2 ID field of a MAC frame that is carrying the response message. The SIGN includes an ECCSI signature of the response message. The signature may be computed over all or a subset of the parameters in the message, or may only be computed over the discoveree info parameter. SAKKE includes an SSV generated by a discoveree UE 804, 806 which has been encoded into a SAKKE payload according to the algorithm described in RFC 6508, using a KMS Public Key and a public identity of the respective discoveree UE 804, 806. In some embodiments, the SAKKE payload is optional. If included, the SAKKE payload or SSV can be used to encrypt all future messages (such as MAC frames) exchanged between the discoverer UE 802 and the respective discoveree UE 804, 806.

Figure 9:
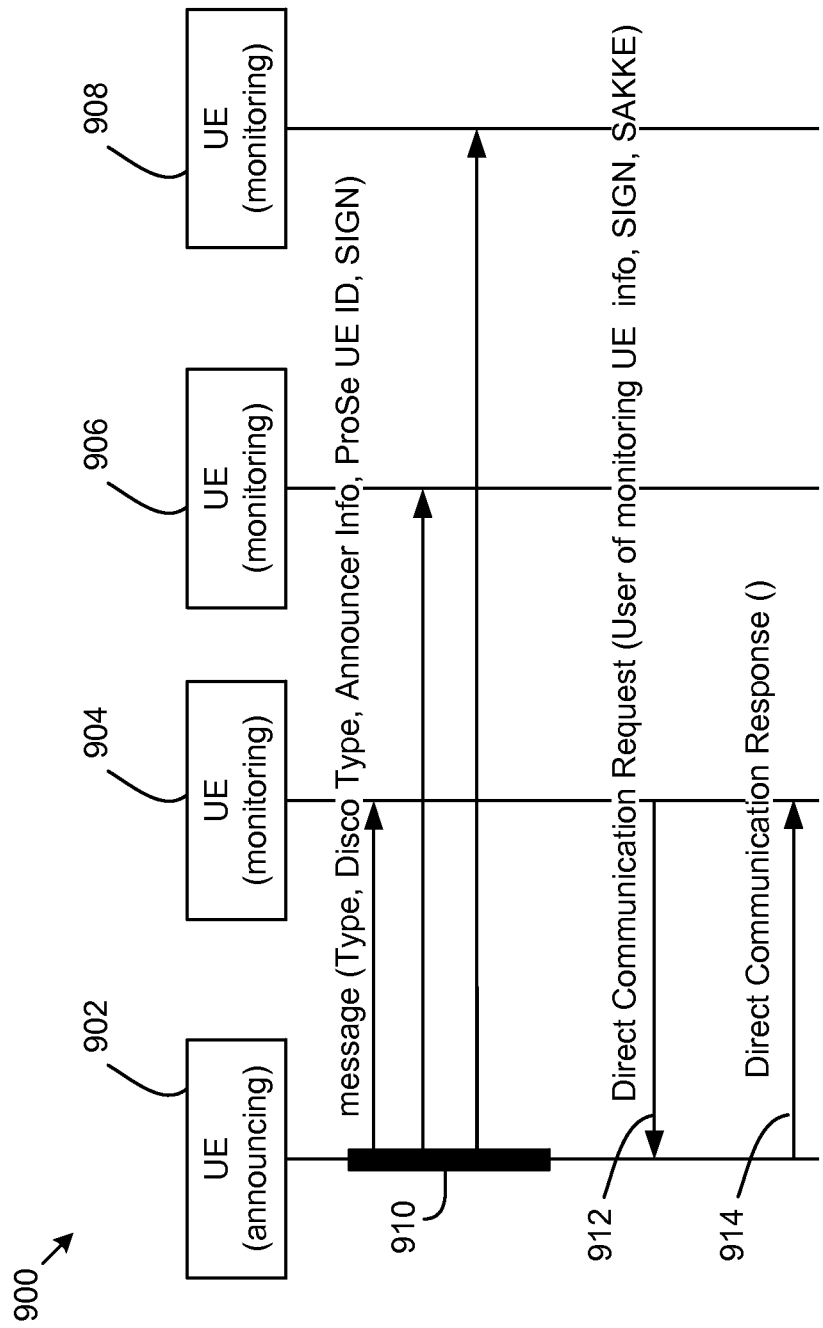
FIG. 9 is a schematic block diagram illustrating an example call flow for Model A group member discovery and direct communication link establishment, consistent with embodiments disclosed herein.

FIG. 9 is a diagram of a call flow 900 illustrating one example of Model A group member discovery between an announcing UE 902 and a plurality of monitoring UEs 904, 906, 908, followed by establishment of a secure layer-2 link with the monitoring UE 904 for one-to-one ProSe direct communication. At 910, the announcing UE 902 periodically transmits a discovery message. In one embodiment, the discovery message includes the following parameter settings: type=announcement; discovery type=group member discovery; announcer info=upper layer information about the user of the announcing UE 902 (this information may be used to derive the signer's identifier ID_s in FIG. 6A); ProSe UE ID=the Layer-2 ID of the announcing UE 902; and SIGN=an ECCSI signature of the announcement message. The signature may be computed over all or a subset of the parameters in the message. In one embodiment, the signature is computed, at a minimum, over the announcer info parameter.

Upon reception of the announcement message, monitoring UE 904 verifies the signature payload SIGN. If the verification test is successful, the monitoring UE 904 presents the authenticated identity ("announcer info") to the user of UE 904. If the user of UE 904 decides to establish a secure layer-2 link for one-to-one ProSe direct communication, UE 904 sends, at 912, a direct communication request message including the following parameters: user of UE 904 info, SIGN, and SAKKE payload. The user of UE 904 info includes upper layer information about the user of UE 904. This information may be used to derive the signer's identifier ID_s in FIG. 6A. The SIGN may include an ECCSI signature of the direct communication request message. The signature may be computed over all or a subset of the parameters in the message. In one embodiment, the signature is computed, at a minimum, over the user of UE 904 info parameter. The SAKKE payload includes an SSV which was generated by the UE 904 and encoded into the SAKKE payload using the KMS Public Key and the public identity of the announcing UE 902 user (announcer info), according to the algorithm described in RFC 6508.

Upon reception of the direct communication request message, the announcing UE 902 verifies the signature payload SIGN. If the verification test is successful, the announcing UE 902 presents the authenticated identity ("user of monitoring UE info") to the user of UE 902. If the user of UE 902 decides to accept the request, UE 902 sends, at 914, a direct communication response message. The direct communication response message is encrypted using a key derived from the SSV contained in the SAKKE payload received at 912. In another embodiment, the SAKKE payload may be included in the direct communication response at 914, instead of the direct communication request at 912. In this case, the direct communication response at 914 may not yet be encoded based on the SSV.

Figure 10:
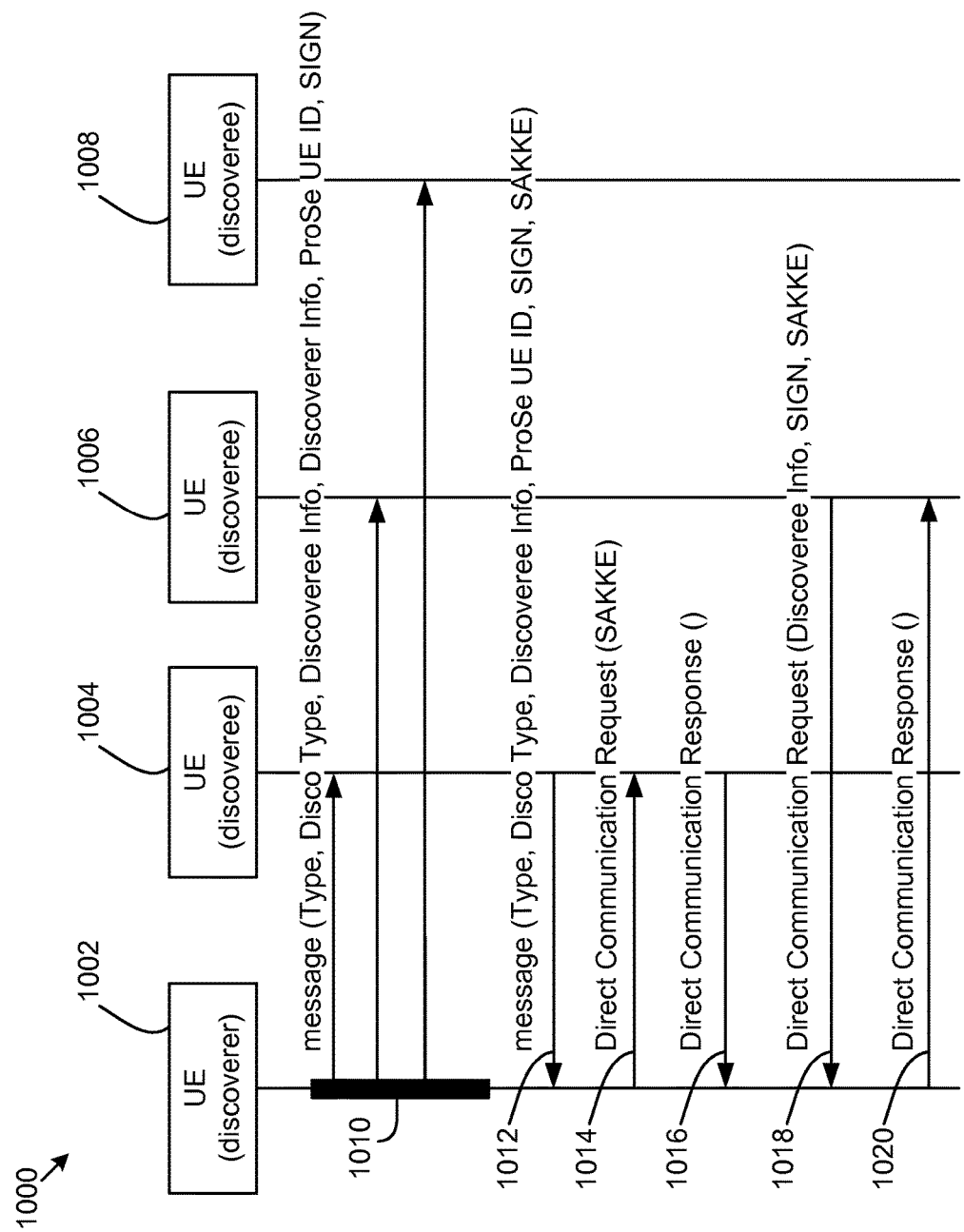
FIG. 10 is a schematic block diagram illustrating an example call flow for Model B group member discovery and direct communication link establishment, consistent with embodiments disclosed herein.

FIG. 10 is a diagram of a call flow 1000 illustrating one example of Model B group member discovery between a discoverer UE 1002 and a plurality of discoveree UEs 1004, 1006, 1008, followed by establishment of a secure layer-2 link for one-to-one ProSe direct communication. At 1010, the discoverer UE 1002 sends a discovery solicitation message. The discovery solicitation message may include the same parameters or variations discussed in relation to the message 810 in FIG. 8. At 1012, the discoveree UE 1004 sends a discovery response message. The discovery response message may include the same parameters or variations discussed in relation to the message 812 of FIG. 8. Note that the inclusion of the SAKKE payload in the response message is optional and may be omitted.

Upon reception of the discovery response message 1012, the discoverer UE 1002 checks the SIGN payload. If the verification test is successful, the authenticated identity of the discoveree UE 1004 user (discoveree info) is presented to the user of discoverer UE 1002. If the user of the discoverer UE 1002 decides to engage in one-to-one communication, the discoverer UE 1002 sends a direct communication request message 1014. If a SAKKE payload was received in the discovery response message 1012, the discoverer UE 1002 uses the SSV provided via the SAKKE payload to encrypt the direct communication request message. If no SAKKE payload was included in the discovery response message 1012, the discoverer UE 1002 generates an SSV and encodes it into a SAKKE payload. In response to receiving the direct communication request message 1014, the discoveree UE 1004 responds at 1016 with a direct communication response message encrypted using the SSV provided inside the SAKKE payload from the message 1012 or the message 1014. The discoverer UE 1002 and the discoveree UE 1004 may then carry on secure one-to-one device-to-device communication.

In response to receiving the discovery solicitation message 1010, the discoveree UE 1006 verifies the signature payload SIGN. If the verification test is successful, the discoveree UE 1006 presents the authenticated identity ("discoverer info") to the user of UE 1006. If user of UE 1006 wishes to establish a secure layer-2 link for one-to-one ProSe direct communication, UE 1006 may forgo sending a response message and proceed with a direct communication request message 1018. The direct communication message may include discoveree info, SIGN, and/or a SAKKE payload. The SAKKE payload may include an SSV encoded using a KMS Public Key and a public identity of the discoverer UE 1002.

In response to receiving the direct communication request message, UE 1002 verifies the signature payload SIGN. If the verification test is successful, the UE 1002 presents the authenticated identity ("discoveree info") to the user of UE 1002. If user of UE 1002 decides to accept the request, UE 1002 sends a direct communication response message 1020. The direct communication response message is encrypted using a key derived from the SSV contained in the SAKKE payload from the message 1018. Alternatively, the SAKKE payload may not be included in the direct communication request at 1018 but may be included instead in the direct communication response at 1020.

Figure 11:
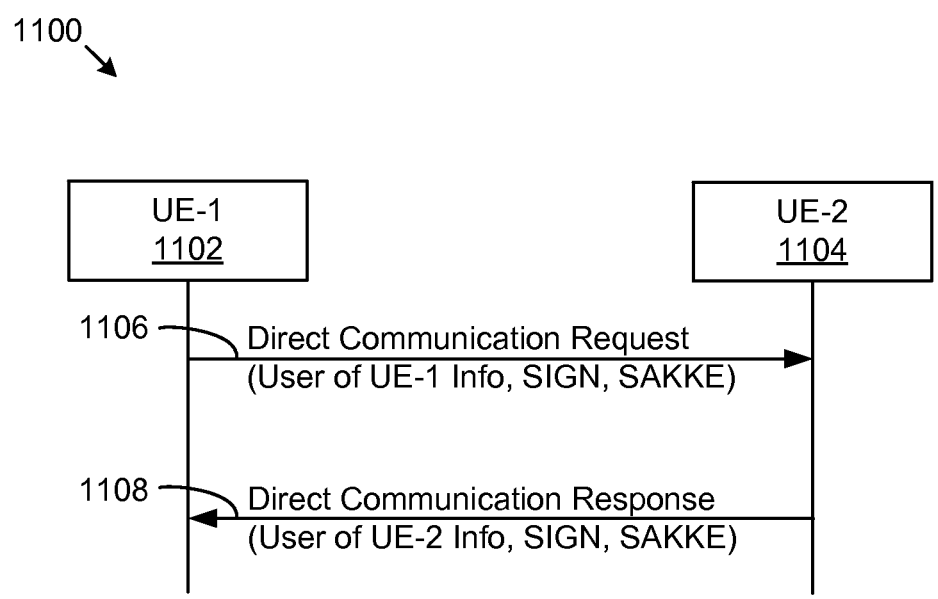
FIG. 11 is a schematic block diagram illustrating an example call flow for link establishment for direct communications, consistent with embodiments disclosed herein.

FIG. 11 is a diagram of a call flow 1100 illustrating one embodiment of establishment of a secure layer-2 link for one-to-one ProSe direct communication. For example, the call flow 1100 of FIG. 11 may occur following unsecured discovery (e.g., without signatures or SSVs). The UE-1 1102 sends a direct communication request message 1106 including the user of UE-1 1102 information, an ECCSI signature, and a SAKKE payload. In response to receiving the direct communication request message, UE-2 1104 verifies the signature payload SIGN. If the user of UE-2 1104 decides to accept the request, the UE-2 1104 sends a direct communication response message 1108 that includes user of UE-2 1104 info and an ECCSI signature. If the direct communication request at 1106 did not include a SAKKE payload, the direct communication response message 1108 may further include a SAKKE payload. Following the direct communication response at 1108, UE-1 1102 and UE-2 1104 may engage in secure device-to-device communication.

In addition to the above examples, the present disclosure is also applicable to other types of D2D discovery and communication. For example, in addition to group member discovery, 3GPP TR 23.713 defines two other types of public safety discovery: ProSe UE-to-network relay discovery (see clause 6.1.2.2) and ProSe UE-to-UE relay discovery (see clause 6.1.2.4). The methods, devices, and other teaching provided herein with regard to group member discovery may also be applied to UE-to-network and UE-to-UE relay discovery.

Currently, the messages for ProSe UE-to-network relay discovery do not contain any information about a user of an announcing, discoverer, or discoveree UE. The example security solutions described previously may still be applied, noting that the SIGN payload may be used to digitally sign the message content without authenticating the user of the announcing, discoverer, or discoveree UE. On the other hand, if it is desirable to authenticate the user of the announcing, discoverer, or discoveree UE, then announcement, solicitation, and response messages may be modified to include announcer info, discoverer info, and discoveree info parameters, respectively.

In one embodiment, the example of FIG. 11 may provide significant utility, as digital signals may not be available for use as discovery signals or messages, or discovery messages may have only limited sizes. Thus, waiting until establishment of a direct communication session to provide SIGN or SAKKE may allow for secure D2D communications without secure or authenticated discovery. On the other hand, embodiments where a signature can be provided during discovery may be advantageous because an identity may be verified even before a user responds to a discovery solicitation or provides a direct communication request. In one embodiment, a signature may be provided without an asserted identity. In this case only the integrity of a message may be verified, although no proof of identity would be available.

Figure 12:
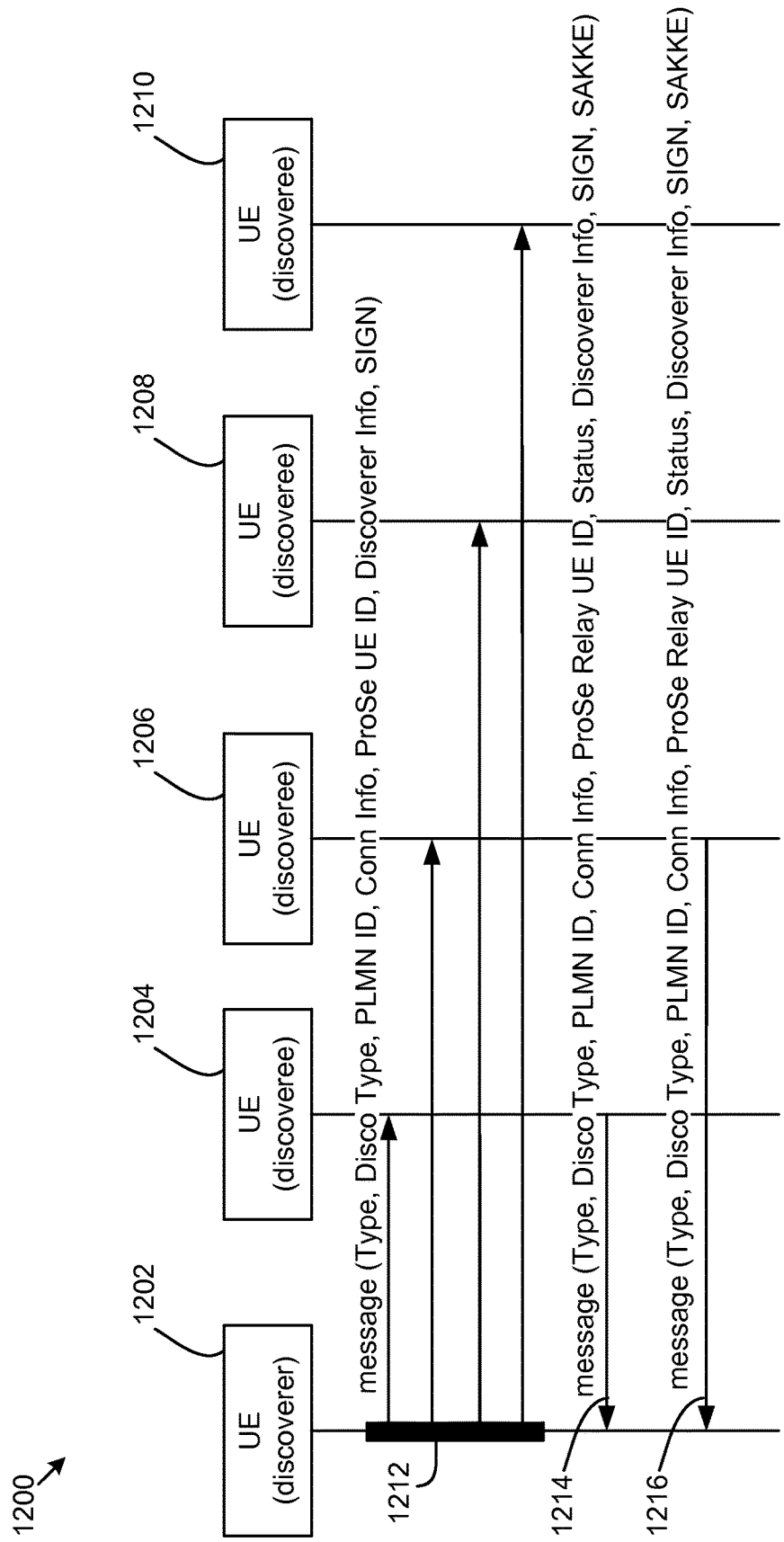
FIG. 12 is a schematic block diagram illustrating an example call flow for UE-to-network relay discovery, consistent with embodiments disclosed herein.

FIG. 12 is a diagram of a call flow 1200 illustrating one example of augmented UE-to-network relay discovery with Model B discovery between a discoverer UE 1202 and a plurality of discoveree UEs 1204, 1206, 1208, 1210. FIG. 12 illustrates a modification of TR 23.713, FIG. 6.1.2.2.2.1, according to one embodiment. At 1212, the discoverer UE 1202 sends a solicitation message that includes a discovery message type, a discovery type, a public land mobility network (PLMN) ID, connection information, a ProSe UE ID, discoverer info, and SIGN. Please note that the call flow 1200 illustrates augmented UE-to-network relay discovery, in that the solicitation message 1212 has been augmented to include discoverer info and SIGN payload. At 1214 and 1216, UEs 1204 and 1206 send discovery response messages that include a discovery message type, a discovery type, a PLMN ID, connection information, a ProSe Relay UE ID, a status, discoverer information, SIGN, and a SAKKE payload. Please note that the call flow 1200 illustrates a further augmented UE-to-network relay discovery in that the response messages 1214 and 1216 have been augmented to include discoverer info, the SIGN payload, and the SAKKE payload.

Figure 13:
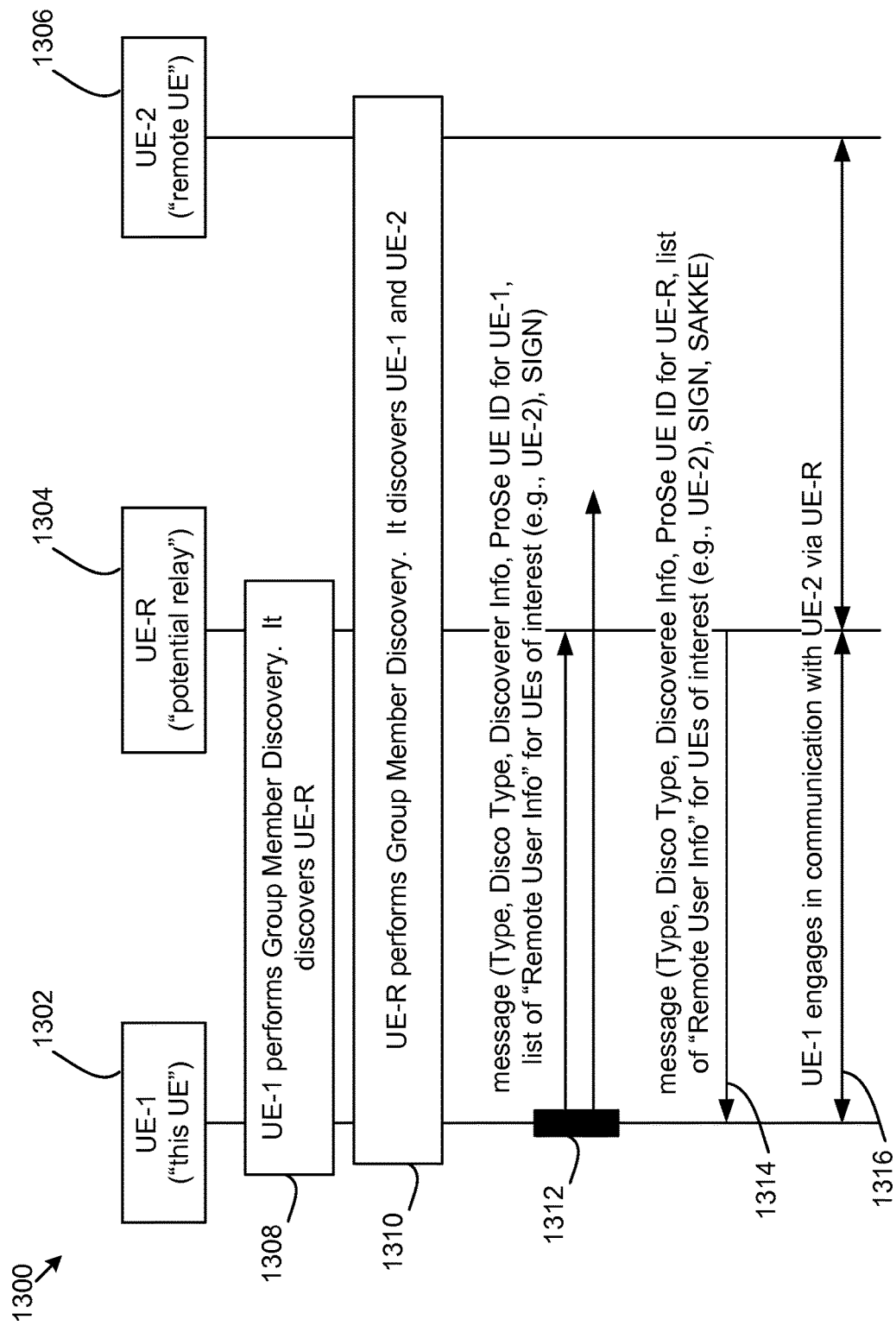
FIG. 13 is a schematic block diagram illustrating an example call flow for UE-to-UE relay discovery, consistent with embodiments disclosed herein.

With regard to UE-to-UE relay discovery, messages for ProSe UE-to-UE relay discovery in the standard already contain information about the user of the announcing, discoverer, or discoveree UE. Thus, the security solution described previously can be applied by adding a SIGN and/or SAKKE payload to the discovery messages. FIG. 13 is a diagram of a call flow 1300 illustrating one example of augmented UE-to-network relay discovery with Model B discovery between UE-1 1302, UE-R 1304, and UE-2 1306. FIG. 13 illustrates a modification of TR 23.713, FIG. 6.1.2.4.2.1, according to one embodiment. Specifically, the message 1312 has been modified to include SIGN, and the message 1314 has been modified to include SIGN and a SAKKE payload. However, it is also noted that UE-to-UE relay discovery relies on prior execution of group member discovery (refer to procedures at 1308 and 1310 in FIG. 13). If a security association has been established during group member discovery, then steps 1312 and 1314 may be executed in encrypted mode, in which case the use of SIGN and SAKKE payload is not needed.

In one embodiment, a UE, or other mobile communication device may be configured to selectively act as any of the UEs illustrated in FIGS. 1-13. For example, depending on a current radio environment, needs of a user of a UE, or other variables, a UE may sometimes act as a discoverer UE, announcing UE, monitoring UE, or discoveree UE. Thus, a single UE may include circuitry, computer readable code, or the like configured to implement any of the functions or methods disclosed herein.

According to one example embodiment, a first UE is configured to discover a second UE and establish a security association with the second UE over a direct link. Following establishment of the security association, the first UE is configured to engage in one-to-one communication with the second UE. In one embodiment, the security association includes mutual authentication and/or agreement of common key material between the first UE and second UE. In one embodiment, the mutual authentication uses the ECCSI signature scheme. In one embodiment, an ECCSI signature payload and a UE identifier are included in a ProSe direct discovery message (announcement, solicitation, or response). In one embodiment, an ECCSI signature payload and a UE identifier are included in a signaling message for establishment of a secure layer-2 link (direct communication request or direct communication response). In one embodiment, the common key material is generated by the first or the second UE and conveyed to the other UE using the SAKKE scheme. In one embodiment, the common key material is included as SAKKE payload in a ProSe direct discovery message (e.g., a response). In one embodiment, the common key material is included as SAKKE payload in a signaling message for establishment of a secure layer-2 link (direct communication request, direct communication response).

Figure 14:
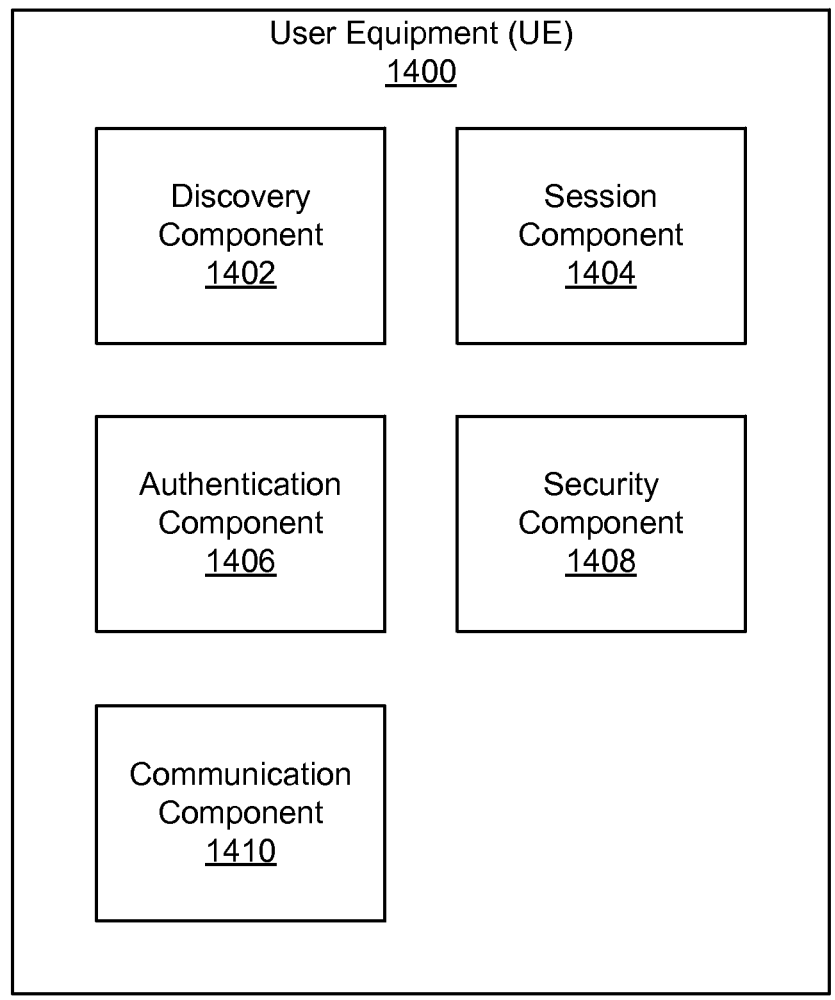
FIG. 14 is a schematic block diagram illustrating components of a UE consistent with embodiments disclosed herein.

Turning to FIG. 14, a schematic block diagram of one embodiment of a UE 1400 is shown. The UE 1400 may be capable of performing the functions of any of the UEs disclosed herein. For example, the UE 1400 may be capable of operating as a discoverer UE, a discoveree UE, an announcing UE, a monitoring UE, or any other UE illustrated or discussed in the present disclosure. The UE 1400 includes a discovery component 1402, a session component 1404, an authentication component 1406, a security component 1408, and a communication component 1410. In one embodiment, one or more of the components 1402-1410 are embodied as circuitry of a processor, such as a baseband processor of the UE 1400. For example, a baseband processor may be sold or manufactured separately and included as part of the UE 1400, such as a mobile phone, a tablet, or an MTC device. The UE 1400 or processor may include logic, circuitry, code, or the like that implements each of the components 1402-1410.

The discovery component 1402 is configured to discover one or more proximal UEs. In one embodiment, the discovery component 1402 is configured to discover other UEs by sending or receiving discovery messages, such as announcement, solicitation, or response discovery messages. In one embodiment, the discovery component 1402 is configured to receive a device-to-device discovery message comprising a signature authenticating an identity of a source mobile communication device. In one embodiment, the discovery component 1402 is configured to format a message comprising a payload authenticating an identity of a user corresponding to the baseband processor, to send to at least one of the one or more proximal UEs.

The session component 1404 is configured to establish a direct communication session, such as a one-to-one ProSe session with another device. In one embodiment, the session component 1404 is configured to send or receive a direct communication request. In one embodiment, the direct communication request comprises a message for establishment of a secure layer-2 link between the UE 1400 and a peer UE. In one embodiment, the session component 1404 is configured to send or receive a direct communication response. For example, the session component 1404 may send a direct communication response in response to receiving a direct communication request or may receive a direct communication response in response to sending a direct communication request.

In one embodiment, the session component 1404 is configured to format or prepare a direct communication request or direct communication response including a signature authenticating an identity of the sending device, e.g., the UE 1400 of FIG. 14. In one embodiment, the signature includes an ECCSI signature. In one embodiment, the direct communication response may also include identifying information of user of the UE 1400. Thus, the signature may be used to authenticate that a user of the UE 1400 is in fact the user corresponding to the included identifying information. Similarly, the session component 1404 may be configured to receive and/or process a direct communication request or response that includes one or more of an ECCSI signature and identifying information of a user corresponding to the sending UE. In one embodiment, a direct communication request or response may be formatted or prepared to include a SAKKE payload. Similarly, the session component 1404 may be configured to receive a direct communication request or response message comprising a SAKKE payload.

The authentication component 1406 is configured to authenticate an identity of a user of at least one peer UE. For example, the authentication component 1406 may verify an identity of a user of a peer UE based on a message received from the peer UE. The message may include a discovery message or a direct communication request or response message. In one embodiment, the message includes a signature that can be used to authenticate an identity of a user of the peer UE. For example, the message may include an ECCSI signature, as discussed herein. In one embodiment, the message may include an indication of an identity of a user of the peer UE so that the authentication component 1406 has sufficient information within a discovery message or direct communication request or response to verify that the peer UE is being used by a specific user. In one embodiment, the authentication component 1406 may verify the identity based on a public authentication key received from a key management service. In one embodiment, the public authentication key may be received from a key management service accessible via a mobile network when the UE 1400 is activated or is within network coverage. In one embodiment, in response to processing the direct communication response from the peer UE to authenticate the identity of the peer UE, the authentication component 1406 may then allow the UE 1400 to engage in direct communication with the peer UE.

The security component 1408 encrypts or decrypts communications between the UE 1400 and a peer UE. In one embodiment, the security component 1408 is configured to encrypt or decrypt communications with the peer UE based on common key material. In one embodiment, the common key material comprises a shared secret value. In one embodiment, the shared secret value may be communicated and agreed upon by the security component 1408 based on the SAKKE scheme. For example, the security component 1408 may receive or send a shared secret value that has been encoded in a SAKKE payload. In one embodiment, the common key material is included as part of a SAKKE payload within the direct communication request or the direct communication response. In one embodiment, the SAKKE payload is included within a discovery message, such as a solicitation, response, or announcement message. In one embodiment, upon agreement of common key material, the security component 1408 may encode or decode communications with a peer UE using the common key material The communication component 1410 is configured to perform communication for the UE 1400. For example, the communication component 1404 may use one or more radios, antennas, or the like to send or receive messages. In one embodiment, the communication component 1410 may send or receive messages on behalf of other components 1402-1408. In one embodiment, the communication component 1404 is configured to communicate with one or more of a peer mobile device, a base station of a wireless network, and/or any other wireless communication device.

As used herein, the term "circuitry" may refer to, be part of, or include an Application Specific Integrated Circuit (ASIC), an electronic circuit, a processor (shared, dedicated, or group), and/or memory (shared, dedicated, or group) that executes one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 15:
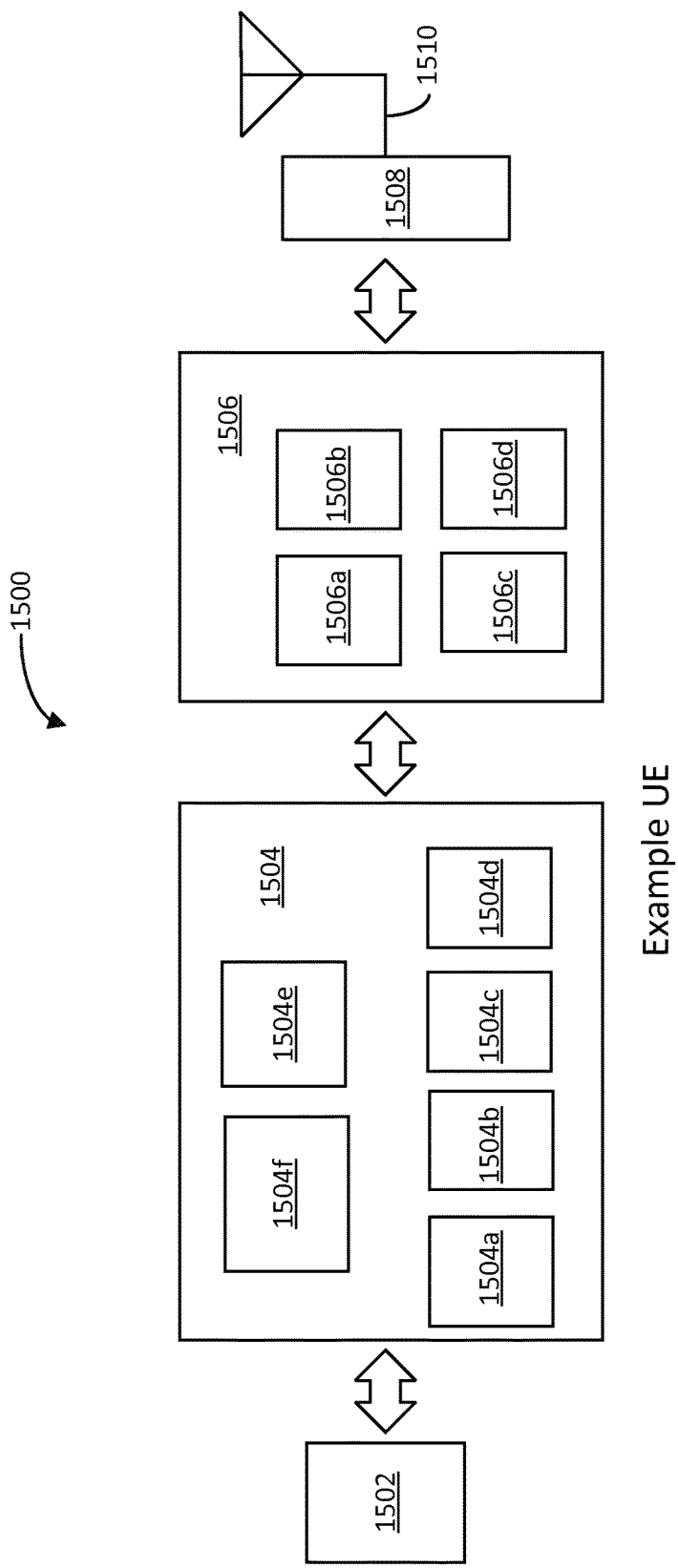
FIG. 15 is a schematic diagram of a mobile device consistent with embodiments disclosed herein.

Embodiments described herein may be implemented into a system using any suitably configured hardware and/or software. FIG. 15 illustrates, for one embodiment, example components of a UE device 1500. In some embodiments, the UE device 1500 may include application circuitry 1502, baseband circuitry 1504, Radio Frequency (RF) circuitry 1506, front-end module (FEM) circuitry 1508 and one or more antennas 1510, coupled together at least as shown.

The application circuitry 1502 may include one or more application processors. For example, the application circuitry 1502 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 1504 may include circuitry such as, but not limited to, one or more single-core or multi-core processors. The baseband circuitry 1504 may include one or more baseband processors and/or control logic to process baseband signals received from a receive signal path of the RF circuitry 1506 and to generate baseband signals for a transmit signal path of the RF circuitry 1506. Baseband processing circuitry 1504 may interface with the application circuitry 1502 for generation and processing of the baseband signals and for controlling operations of the RF circuitry 1506. For example, in some embodiments, the baseband circuitry 1504 may include a second generation (2G) baseband processor 1504a, third generation (3G) baseband processor 1504b, fourth generation (4G) baseband processor 1504c, and/or other baseband processor(s) 1504d for other existing generations or generations in development or to be developed in the future (e.g., fifth generation (5G), 6G, etc.). The baseband circuitry 1504 (e.g., one or more of baseband processors 1504a-d) may handle various radio control functions that enable communication with one or more radio networks via the RF circuitry 1506. The radio control functions may include, but are not limited to, signal modulation/demodulation, encoding/decoding, radio frequency shifting, etc. In some embodiments, modulation/demodulation circuitry of the baseband circuitry 1504 may include Fast-Fourier Transform (FFT), precoding, and/or constellation mapping/demapping functionality. In some embodiments, encoding/decoding circuitry of the baseband circuitry 1504 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1504 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1504e of the baseband circuitry 1504 may be configured to run elements of the protocol stack for signaling of the PHY, MAC, RLC, PDCP, and/or RRC layers. In some embodiments, the baseband circuitry 1504 may include one or more audio digital signal processor(s) (DSP) 1504f. The audio DSP(s) 1504f may include elements for compression/decompression and echo cancellation and may include other suitable processing elements in other embodiments. Components of the baseband circuitry 1504 may be suitably combined in a single chip or single chipset, or disposed on a same circuit board in some embodiments. In some embodiments, some or all of the constituent components of the baseband circuitry 1504 and the application circuitry 1502 may be implemented together, such as, for example, on a system on a chip (SOC).

In some embodiments, the baseband circuitry 1504 may provide for communication compatible with one or more radio technologies. For example, in some embodiments, the baseband circuitry 1504 may support communication with an evolved universal terrestrial radio access network (EUTRAN) and/or other wireless metropolitan area networks (WMAN), a wireless local area network (WLAN), or a wireless personal area network (WPAN). Embodiments in which the baseband circuitry 1504 is configured to support radio communications of more than one wireless protocol may be referred to as multi-mode baseband circuitry.

RF circuitry 1506 may enable communication with wireless networks using modulated electromagnetic radiation through a non-solid medium. In various embodiments, the RF circuitry 1506 may include switches, filters, amplifiers, etc., to facilitate the communication with the wireless network. RF circuitry 1506 may include a receive signal path, which may include circuitry to down-convert RF signals received from the FEM circuitry 1508 and provide baseband signals to the baseband circuitry 1504. RF circuitry 1506 may also include a transmit signal path, which may include circuitry to up-convert baseband signals provided by the baseband circuitry 1504 and provide RF output signals to the FEM circuitry 1508 for transmission.

In some embodiments, the receive signal path of the RF circuitry 1506 may include mixer circuitry 1506*a*, amplifier circuitry 1506*b*, and filter circuitry 1506*c*. The transmit signal path of the RF circuitry 1506 may include filter circuitry 1506*c* and mixer circuitry 1506*a*. RF circuitry 1506 may also include synthesizer circuitry 1506*d* for synthesizing a frequency for use by the mixer circuitry 1506*a* of the receive signal path and the transmit signal path. In some embodiments, the mixer circuitry 1506*a* of the receive signal path may be configured to down-convert RF signals received from the FEM circuitry 1508 based on the synthesized frequency provided by synthesizer circuitry 1506*d*. The amplifier circuitry 1506*b* may be configured to amplify the down-converted signals, and the filter circuitry 1506*c* may be a low-pass filter (LPF) or band-pass filter (BPF) configured to remove unwanted signals from the down-converted signals to generate output baseband signals. Output baseband signals may be provided to the baseband circuitry 1504 for further processing. In some embodiments, the output baseband signals may be zero-frequency baseband signals, although this is not a requirement. In some embodiments, mixer circuitry 1506*a* of the receive signal path may comprise passive mixers, although the scope of the embodiments is not limited in this respect.

In some embodiments, the mixer circuitry 1506*a* of the transmit signal path may be configured to up-convert input baseband signals based on the synthesized frequency provided by the synthesizer circuitry 1506*d* to generate RF output signals for the FEM circuitry 1508. The baseband signals may be provided by the baseband circuitry 1504 and may be filtered by filter circuitry 1506*c*. The filter circuitry 1506*c* may include a low-pass filter (LPF), although the scope of the embodiments is not limited in this respect.

In some embodiments, the mixer circuitry 1506*a* of the receive signal path and the mixer circuitry 1506*a* of the transmit signal path may include two or more mixers and may be arranged for quadrature downconversion and/or upconversion respectively. In some embodiments, the mixer circuitry 1506*a* of the receive signal path and the mixer circuitry 1506*a* of the transmit signal path may include two or more mixers and may be arranged for image rejection (e.g., Hartley image rejection). In some embodiments, the mixer circuitry 1506*a* of the receive signal path and the mixer circuitry 1506*a* of the transmit signal path may be arranged for direct downconversion and/or direct upconversion, respectively. In some embodiments, the mixer circuitry 1506*a* of the receive signal path and the mixer circuitry 1506*a* of the transmit signal path may be configured for super-heterodyne operation.

In some embodiments, the output baseband signals and the input baseband signals may be analog baseband signals, although the scope of the embodiments is not limited in this respect. In some alternative embodiments, the output baseband signals and the input baseband signals may be digital baseband signals. In these alternative embodiments, the RF circuitry 1506 may include analog-to-digital converter (ADC) and digital-to-analog converter (DAC) circuitry, and the baseband circuitry 1504 may include a digital baseband interface to communicate with the RF circuitry 1506.

In some dual-mode embodiments, a separate radio IC circuitry may be provided for processing signals for each spectrum, although the scope of the embodiments is not limited in this respect.

In some embodiments, the synthesizer circuitry 1506*d* may be a fractional-N synthesizer or a fractional N/N+1 synthesizer, although the scope of the embodiments is not limited in this respect, as other types of frequency synthesizers may be suitable. For example, synthesizer circuitry 1506*d* may be a delta-sigma synthesizer, a frequency multiplier, or a synthesizer comprising a phase-locked loop with a frequency divider.

The synthesizer circuitry 1506*d* may be configured to synthesize an output frequency for use by the mixer circuitry 1506*a* of the RF circuitry 1506 based on a frequency input and a divider control input. In some embodiments, the synthesizer circuitry 1506*d* may be a fractional N/N+1 synthesizer.

In some embodiments, frequency input may be provided by a voltage controlled oscillator (VCO), although that is not a requirement. Divider control input may be provided by either the baseband circuitry 1504 or the application circuitry 1502, depending on the desired output frequency. In some embodiments, a divider control input (e.g., N) may be determined from a look-up table based on a channel indicated by the application circuitry 1502.

Synthesizer circuitry 1506*d* of the RF circuitry 1506 may include a divider, a delay-locked loop (DLL), a multiplexer, and a phase accumulator. In some embodiments, the divider may be a dual modulus divider (DMD), and the phase accumulator may be a digital phase accumulator (DPA). In some embodiments, the DMD may be configured to divide the input signal by either N or N+1 (e.g., based on a carry-out) to provide a fractional division ratio. In some example embodiments, the DLL may include a set of cascaded, tunable, delay elements; a phase detector; a charge pump; and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1506*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1506 may include an IQ/polar converter.

FEM circuitry 1508 may include a receive signal path, which may include circuitry configured to operate on RF signals received from one or more antennas 1510, amplify the received signals, and provide the amplified versions of the received signals to the RF circuitry 1506 for further processing. FEM circuitry 1508 may also include a transmit signal path, which may include circuitry configured to amplify signals for transmission provided by the RF circuitry 1506 for transmission by one or more of the one or more antennas 1510.

In some embodiments, the FEM circuitry 1508 may include a TX/RX switch to switch between transmit mode and receive mode operation. The receive signal path of the FEM 1508 circuitry may include a low-noise amplifier (LNA) to amplify received RF signals and provide the amplified received RF signals as an output (e.g., to the RF circuitry 1506). The transmit signal path of the FEM circuitry 1508 may include a power amplifier (PA) to amplify input RF signals (e.g., provided by RF circuitry 1506), and one or more filters to generate RF signals for subsequent transmission (e.g., by one or more of the one or more antennas 1510).

In some embodiments, the UE device 1500 may include additional elements, such as, for example, memory/storage, a display, a camera, a sensor, and/or an input/output (I/O) interface.

EXAMPLES

The following examples pertain to further embodiments.

Example 1 is a UE that is configured to send a direct communication request to a peer UE, wherein the direct communication request comprises a first signature authenticating an identity of a user of the UE. The UE processes a direct communication response from the peer UE to authenticate an identity of the peer UE. The direct communication response comprises a second signature authenticating the identity of a user of the peer UE. In response to processing the direct communication response from the peer UE to authenticate the identity of the peer UE, the UE engages in direct communication with the peer UE.

Example 2 includes the UE of Example 1, wherein one or more of the first signature authenticating the identity of the user of the UE and the second signature authenticating the identity of the user of the peer UE comprise a signature based on an Elliptic Curve-based Certificateless Signatures for Identity-based Encryption (ECCSI) signature scheme.

Example 3 includes the UE of any of Examples 1-2, wherein one or more of the direct communication request and the direct communication response comprise messages for establishment of a secure layer-2 link between the UE and the peer UE.

Example 4 includes the UE of any of Examples 1-3, wherein the UE is further configured to agree on common key material for communication between the UE and the peer UE, wherein the common key material is used for encoding or decoding communications between the UE and the peer UE.

Example 5 includes the UE in Example 4, wherein the UE is configured to agree on the common key material by transmitting the common key material to the peer UE or receiving the common key material from the peer UE, wherein the common key material is generated and communicated between the UE and the peer UE based on the Sakai-Kasahara Key Encryption (SAKKE) scheme.

Example 6 includes the UE in Example 5, wherein the common key material is included as part of a SAKKE payload within the direct communication request or the direct communication response.

Example 7 includes the UE of any of Examples 1-6, wherein one or more of the first signature authenticating the identity of the user of the UE and the second signature authenticating the identity of the user of the peer UE is computed over one or more other parameters in a corresponding message for message integrity protection.

Example 8 is a mobile communication device that includes a discovery component configured to receive a device-to-device discovery message comprising a signature authenticating an identity of a source mobile communication device, and an authentication component configured to verify the identity of the source mobile communication device based on the signature and send or receive a message comprising a shared secret value. The mobile communication device further includes a security component configured to encrypt or decrypt one or more communications between the mobile communication device and the source mobile communication device using the shared secret value.

Example 9 includes the mobile communication device of Example 8, wherein the device-to-device discovery message comprises one or more of a discovery announcement message, a discovery solicitation message, and a discovery response message.

Example 10 includes the mobile communication device of any of Examples 8-9, wherein the signature authenticating the identity of the source mobile communication device comprises a signature based on an Elliptic Curve-based Certificateless Signatures for Identity-based Encryption (ECCSI) signature scheme.

Example 11 includes the mobile communication device of Example 10, wherein the authentication component is configured to verify the signature based on a public authentication key received from a key management service.

Example 12 includes the mobile communication device of any of Examples 8-11, wherein the message comprising the shared secret value comprises a Sakai-Kasahara Key Encryption (SAKKE) payload, wherein the SAKKE payload comprises the shared secret value encoded based on the SAKKE scheme.

Example 13 includes the mobile communication device of Example 12, wherein the message comprising the shared secret value comprises a direct communication request or a direct communication response for establishment of secure physical-layer link.

Example 14 includes the mobile communication device of Example 12, wherein the message comprising the shared secret value comprises a discovery message.

Example 15 includes the mobile communication device of any of Examples 8-15, wherein the device-to-device discovery message further comprises a user identity corresponding to the source mobile communication device, wherein the authentication component is configured to verify the user identity based on the signature.

Example 16 is a baseband processor including logic to discover one or more proximal user equipment (UE), format a message comprising a payload authenticating an identity of a user corresponding to the baseband processor to send to at least one of the one or more proximal UE, authenticate an identity of a user of the at least one of the one or more proximal UEs, and communicate directly with the at least one of the one or more proximal UEs.

Example 17 includes the baseband processor of Example 16, wherein the message comprising the payload comprises one of a discovery announcement message, a discovery solicitation message, and a discovery response message.

Example 18 includes the baseband processor of Example 16, wherein the message comprises a message to establish direct communication between a UE corresponding to the baseband processor and the at least one of the one or more proximal UE.

Example 19 includes the baseband processor of any of Examples 16-18, wherein the logic is further configured to determine a secret key for communication between the at least one proximal UE and a UE corresponding to the baseband processor, wherein the logic is configured to encode or decode communications between the at least one proximal UE and a UE corresponding to the baseband processor based on the secret key.

Example 20 includes the baseband processor of any of Examples 16-19, wherein the payload comprises the identity of the user corresponding to the baseband processor and a signature based on an Elliptic Curve-based Certificateless Signatures for Identity-based Encryption (ECCSI) signature scheme.

Example 21 is a method that includes sending, from a user equipment (UE), a direct communication request to a peer UE. The direct communication request comprises a first signature authenticating an identity of a user of the UE. The method also includes processing a direct communication response from the peer UE to authenticate an identity of the peer UE. The direct communication response comprises a second signature authenticating the identity of a user of the peer UE. In response to processing the direct communication response from the peer UE to authenticate the identity of the peer UE, the method further includes engaging in direct communication with the peer UE.

Example 22 includes the method of Example 21, wherein one or more of the first signature authenticating the identity of the user of the UE and the second signature authenticating the identity of the user of the peer UE comprise a signature based on an Elliptic Curve-based Certificateless Signatures for Identity-based Encryption (ECCSI) signature scheme.

Example 23 includes the method of any of Examples 21-22, wherein one or more of the direct communication request and the direct communication response comprise messages for establishment of a secure layer-2 link between the UE and the peer UE.

Example 24 includes the method of any of Examples 21-23, further comprising agreeing on common key material for communication between the UE and the peer UE, wherein the common key material is used for encoding or decoding communications between the UE and the peer UE.

Example 25 includes the method in Example 24, further comprising transmitting the common key material to the peer UE or receiving the common key material from the peer UE, wherein the common key material is generated and communicated between the UE and the peer UE based on the Sakai-Kasahara Key Encryption (SAKKE) scheme.

Example 26 includes the method in Example 25, further comprising including the common key material as part of a SAKKE payload within the direct communication request or the direct communication response.

Example 27 includes the method of any of Examples 21-26, further comprising computing one or more of the first signature authenticating the identity of the user of the UE and the second signature authenticating the identity of the user of the peer UE over one or more other parameters for message integrity protection.

Example 28 is a method including receiving a device-to-device discovery message comprising a signature authenticating an identity of a source mobile communication device, verifying the identity of the source mobile communication device based on the signature, sending or receiving a message comprising a shared secret value, and encrypting or decrypting one or more communications to or from the source mobile communication device using the shared secret value.

Example 29 includes the method of Example 28, wherein the device-to-device discovery message comprises one or more of a discovery announcement message, a discovery solicitation message, and a discovery response message.

Example 30 includes the method of any of Examples 28-29, wherein the signature authenticating the identity of the source mobile communication device comprises a signature based on an Elliptic Curve-based Certificateless Signatures for Identity-based Encryption (ECCSI) signature scheme.

Example 31 includes the method of Example 30, further comprising verifying the signature based on a public authentication key received from a key management service.

Example 32 includes the method of any of Examples 28-31, wherein the message comprising the shared secret value comprises a Sakai-Kasahara Key Encryption (SAKKE) payload, wherein the SAKKE payload comprises the shared secret value encoded based on the SAKKE scheme.

Example 33 includes the method of Example 32, wherein the message comprising the shared secret value comprises a direct communication request or a direct communication response for establishment of secure physical-layer link.

Example 34 includes the method of Example 32, wherein the message comprising the shared secret value comprises a discovery message.

Example 35 includes the method of any of Examples 28-34, wherein the device-to-device discovery message further comprises a user identity corresponding to the source mobile communication device, wherein the method further comprises verifying the user identity based on the signature.

Example 36 is a method comprising discovering one or more proximal user equipment (UE), formatting a message comprising a payload authenticating an identity of a user corresponding to a baseband processor to send to at least one of the one or more proximal UE, authenticating an identity of a user of the at least one of the one or more proximal UEs, and communicating directly with the at least one of the one or more proximal UEs.

Example 37 include the method of Example 36, wherein the message comprising the payload comprises one of a discovery announcement message, a discovery solicitation message, and a discovery response message.

Example 38 include the method of any of Example 36-37, wherein the message comprises a message to establish direct communication between a UE corresponding to the baseband processor and the at least one of the one or more proximal UE.

Example 39 include the method of any of Example 36-38, further comprising determining a secret key for communication between the at least one proximal UE and a UE corresponding to the baseband processor, wherein the logic is configured to encode or decode communications between the at least one proximal UE and a UE corresponding to the baseband processor based on the secret key.

Example 40 include the method of any of Example 36-39, wherein the payload comprises the identity of the user corresponding to the baseband processor and a signature based on an Elliptic Curve-based Certificateless Signatures for Identity-based Encryption (ECCSI) signature scheme.

Example 41 is an apparatus comprising means to perform a method as recited in any of Examples 21-40.

Example 42 includes at least one computer-readable storage medium having stored thereon computer-readable instructions, when executed, to implement a method as recited in any of Example 21-40.

Various techniques, or certain aspects or portions thereof, may take the form of program code (i.e., instructions) embodied in tangible media, such as floppy diskettes, CD-ROMs, hard drives, a non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or an interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present invention. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

Those having skill in the art will appreciate that many changes may be made to the details of the above-described embodiments without departing from the underlying principles of the invention. The scope of the present invention should, therefore, be determined only by the following claims.

The invention claimed is:

1. User equipment (UE), comprising:
   a memory device to store instructions; and
   a baseband processor to execute the instructions to:
   process a discovery response message from a peer UE to determine whether or not the discovery response message includes a payload comprising first a shared secret value (SSV);
   generate a direct communication request to the peer UE, wherein the direct communication request comprises a first signature authenticating an identity of a user of the UE;
   if the discovery response message includes the payload comprising the first SSV, use the first SSV provided in the payload of the discovery response message to encrypt the direct communication request;
   if the discovery response message does not include the payload comprising the first SSV, generate a second SSV to share with the peer UE and encode the second SSV into a payload of the direct communication request;
   decrypt, using the first SSV if included in the discovery response message, or using the second SSV if the first SSV is not included in the discovery response message, a direct communication response from the peer UE to authenticate an identity of the peer UE, wherein the direct communication response comprises a second signature authenticating the identity of a user of the peer UE; and
   in response to the direct communication response from the peer UE to authenticate the identity of the peer UE, engage in direct communication with the peer UE using the first SSV if included in the discovery response message, or using the second SSV if the first SSV is not included in the discovery response message,
   wherein common key material, for communication between the UE and the peer UE, is generated and communicated between the UE and the peer UE based on a Sakai-Kasahara Key Encryption (SAKKE) scheme.

2. The UE of claim 1, wherein one or more of the first signature authenticating the identity of the user of the UE and the second signature authenticating the identity of the user of the peer UE comprise a signature based on an Elliptic Curve-based Certificateless Signatures for Identity-based Encryption (ECCSI) signature scheme.

3. The UE of claim 1, wherein one or more of the direct communication request and the direct communication response comprise messages for establishment of a secure layer-2 link between the UE and the peer UE.

4. The UE of claim 1, wherein the baseband processor is further configured to agree on the common key material for communication between the UE and the peer UE, wherein the common key material is used for encoding or decoding communications between the UE and the peer UE.

5. The UE in claim 4, wherein the baseband processor is configured to agree on the common key material by generating the common key material for communication to the peer UE or processing the common key material received from the peer UE.

6. The UE in claim 5, wherein the common key material is included as part of a SAKKE payload within the direct communication request or the direct communication response.

7. The UE of claim 1, wherein one or more of the first signature authenticating the identity of the user of the UE and the second signature authenticating the identity of the user of the peer UE is computed over one or more other parameters in a corresponding message for message integrity protection.

8. A baseband processor comprising:
memory to store an identity of a user corresponding to the baseband processor; and
circuitry to:
discover, based on a discovery response message, a proximal user equipment (UE);
determine whether the discovery response message includes a first shared secret value (SSV);
format a message comprising a payload authenticating the identity of the user corresponding to the baseband processor to send to the proximal UE;
if the discovery response message includes the first SSV, encrypt the message comprising the payload using the first SSV;
if the discovery response message does not include the first SSV, generate a second SSV to include in the payload to share with the proximal UE;
authenticate an identity of a user of the proximal UE; and
communicate directly with the proximal UE to encrypt and decrypt direct messages using the first or second SSV,
wherein common key material, for communication with the proximal UE, is generated and communicated with the proximal UE based on a Sakai-Kasahara Key Encryption (SAKKE) scheme.

9. The baseband processor of claim 8, wherein the message comprises a message to establish direct communication between a UE corresponding to the baseband processor and the at least one of the one or more proximal UE.

10. The baseband processor of claim 8, wherein the circuitry is further configured to determine a secret key for communication between the proximal UE and a UE corresponding to the baseband processor, wherein the circuitry is configured to encode or decode communications between the proximal UE and a UE corresponding to the baseband processor based on the secret key.

11. The baseband processor of claim 8, wherein the payload comprises the identity of the user corresponding to the baseband processor and a signature based on an Elliptic Curve-based Certificateless Signatures for Identity-based Encryption (ECCSI) signature scheme.

* * * * *